(12) United States Patent
Mizuno

(10) Patent No.: US 12,316,820 B2
(45) Date of Patent: May 27, 2025

(54) IMAGE PROCESSING APPARATUS, METHOD, SYSTEM, AND STORAGE MEDIUM TO GENERATE A VIRTUAL VIEWPOINT IMAGE BASED ON A CAPTURED IMAGE

(71) Applicant: CANON KABUSHIKI KAISHA, Tokyo (JP)

(72) Inventor: Shogo Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/311,747

(22) Filed: May 3, 2023

(65) Prior Publication Data
US 2023/0370575 A1    Nov. 16, 2023

(30) Foreign Application Priority Data
May 12, 2022 (JP) .................................. 2022-078716

(51) Int. Cl.
*H04N 13/117* (2018.01)
*G06T 5/50* (2006.01)
(Continued)

(52) U.S. Cl.
CPC ............. *H04N 13/117* (2018.05); *G06T 5/50* (2013.01); *G06T 7/70* (2017.01); *G06T 17/00* (2013.01);
(Continued)

(58) Field of Classification Search
CPC ............... H04N 13/117; H04N 13/279; H04N 21/6587; H04N 23/90; H04N 21/21805;
(Continued)

(56) References Cited

U.S. PATENT DOCUMENTS 10,839,594 B2    11/2020    Besley
2007/0121722 A1*  5/2007   Martinian ............ H04N 19/597
                                                      375/E7.031
(Continued)

FOREIGN PATENT DOCUMENTS

| EP | 3771199 A1 | 1/2021 | |
|---|---|---|---|
| EP | 3796260 A1 * | 3/2021 | ............... G06T 7/55 |
| JP | 2019079468 A | 5/2019 | |

OTHER PUBLICATIONS

Lipski, C., et al., "Virtual Video Camera: Image-Based Viewpoint Navigation Through Space and Time," Computer Graphics Forum: Journal of the European Association for Computer Graphics, Wiley-Blackwell, Oxford, vol. 29, No. 8, Sep. 27, 2010, p. 2555-2568, XP071487860.

*Primary Examiner* — Maurice L. McDowell, Jr.
(74) *Attorney, Agent, or Firm* — Canon U.S.A., Inc. IP Division

(57) ABSTRACT

An image processing apparatus predicts a virtual viewpoint in a second frame subsequent to a first frame in a virtual viewpoint image and a position of a three-dimensional subject model in the second frame. The image processing apparatus determines an image capturing apparatus from which a captured image to be used for generating the second frame is obtained from among the plurality of image capturing apparatuses based on the predicted virtual viewpoint, the predicted position of the three-dimensional subject model, and image capturing parameters of the image capturing apparatuses, and generates the virtual viewpoint image based on the captured image for the second frame obtained from the determined image capturing apparatus, the three-dimensional subject model corresponding to the second frame, and the virtual viewpoint information corresponding to the second frame.

19 Claims, 13 Drawing Sheets

(51) Int. Cl.
*G06T 7/70* (2017.01)
*G06T 17/00* (2006.01)
*H04N 13/279* (2018.01)

(52) U.S. Cl.
CPC . *H04N 13/279* (2018.05); *G06T 2207/20221* (2013.01)

(58) Field of Classification Search
CPC .. G06T 5/50; G06T 7/70; G06T 17/00; G06T 2207/20221
See application file for complete search history.

(56) References Cited

U.S. PATENT DOCUMENTS

| | | | |
|---|---|---|---|
| 2008/0129825 A1* | 6/2008 | DeAngelis | H04N 23/661 348/E7.086 |
| 2018/0048810 A1* | 2/2018 | Matsushita | G06T 15/00 |
| 2018/0063514 A1* | 3/2018 | Mizuno | G06F 3/14 |
| 2018/0204381 A1 | 7/2018 | Kanatsu | |
| 2019/0182470 A1* | 6/2019 | Mizuno | G06T 15/205 |
| 2020/0168252 A1 | 5/2020 | Bhuruth | |
| 2021/0090322 A1* | 3/2021 | Hunt | G06F 3/012 |

\* cited by examiner

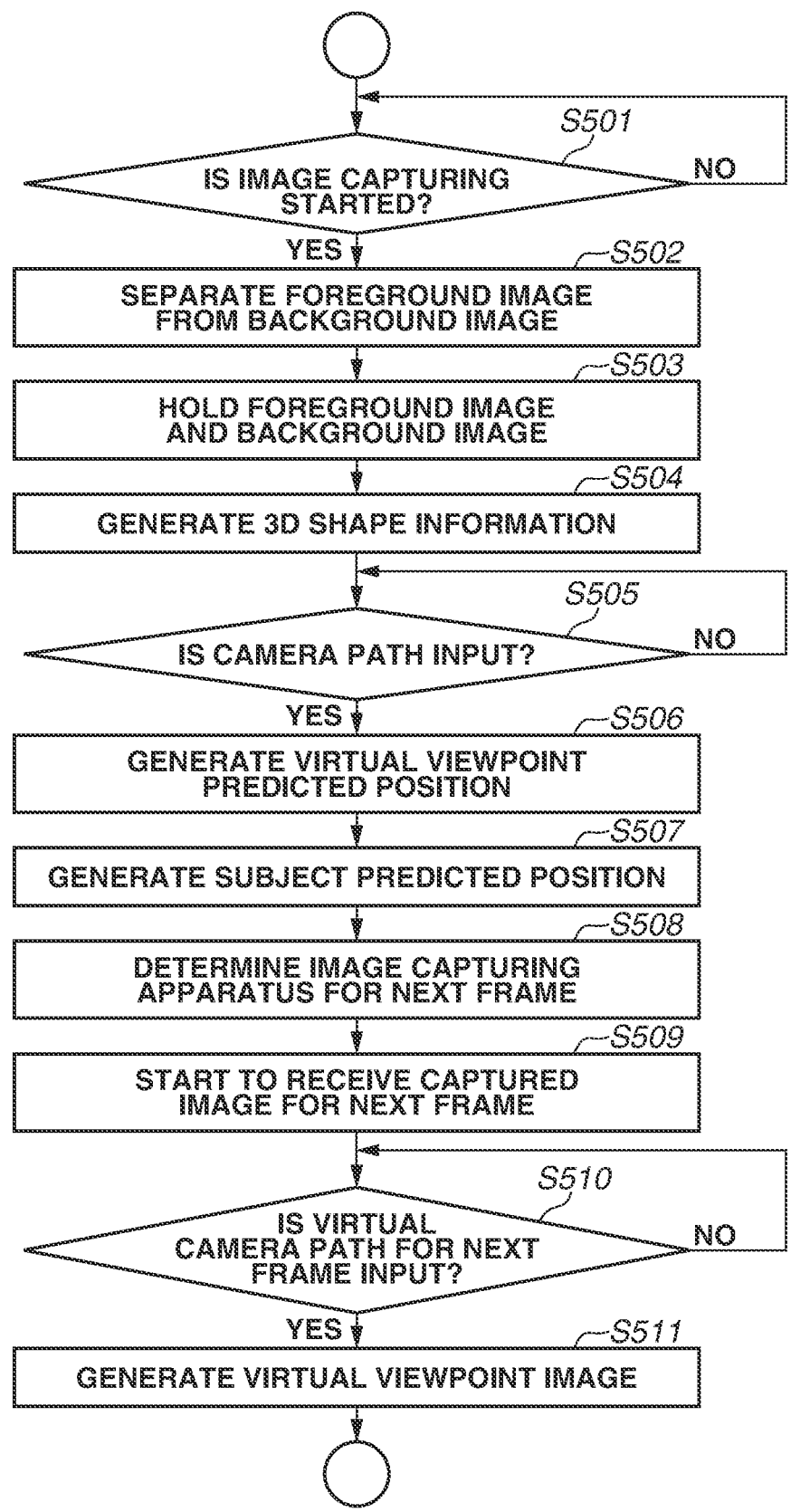

FIG.10

| IDENTIFIER OF IMAGE CAPTURING APPARATUS | PRIORITY |
|---|---|
| 602 | 1 |
| 601 | 2 |
| 606 | 3 |
| 604 | 4 |
| 603 | 5 |
| 605 | 6 |

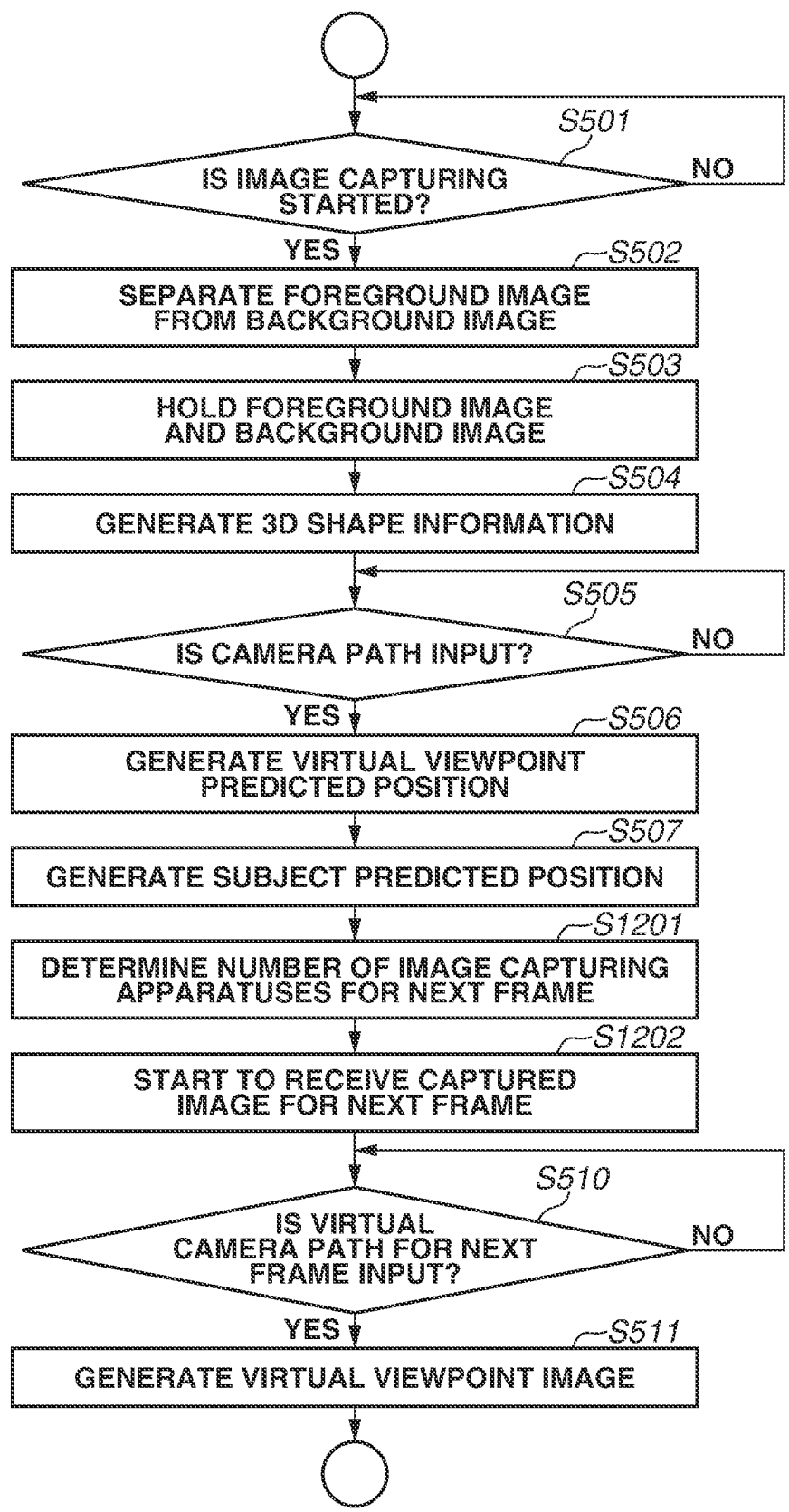

IMAGE PROCESSING APPARATUS, METHOD, SYSTEM, AND STORAGE MEDIUM TO GENERATE A VIRTUAL VIEWPOINT IMAGE BASED ON A CAPTURED IMAGE

BACKGROUND OF THE DISCLOSURE

Field of the Disclosure

The present disclosure relates to a technique for generating a virtual viewpoint image based on captured images obtained from a plurality of image capturing apparatuses.

Description of the Related Art

There is a technique of generating not only images at installation positions of image capturing apparatuses, but also virtual viewpoint images seemingly been captured from arbitrary virtual viewpoints. The technique synchronously captures images from multiple viewpoints with a plurality of image capturing apparatuses installed at different positions, and uses the multiple viewpoint images captured in the image capturing. The virtual viewpoint images are generated by aggregating images captured by the plurality of image capturing apparatuses at the multiple viewpoints into an image processing apparatus, such as a server, and the image processing apparatus performs processing, such as rendering processing, based on the arbitrary virtual viewpoints. According to this virtual viewpoint image generation technique, a video content from a viewpoint with reality can be created by a video creator using images obtained by capturing images of, for example, dancing or acting performance. If a user who is viewing a content sets the virtual viewpoint, the user can freely move the viewpoint. This thereby makes it possible to provide a more realistic sensation to the user as compared with general image capturing in which virtual viewpoint images are not generated.

The installation position of each of the plurality of image capturing apparatuses is linked to the corresponding position in a virtual space. In the case of generating a virtual viewpoint image from virtual viewpoints at positions different from the installation positions of the image capturing apparatuses, images captured by the image capturing apparatuses located near the virtual viewpoint are used. In other words, the image capturing apparatuses from which the captured images to be used for generating the virtual viewpoint image are obtained vary depending on the position of the virtual viewpoint.

The image capturing apparatuses from which the captured images, to be used for generating the virtual viewpoint image, are obtained are sequentially changed based on the movement of the virtual viewpoint. In this case, the captured images to be used for generating the virtual viewpoint image in accordance with the movement of the virtual viewpoint are sequentially switched and read out from the captured images that are obtained by the image capturing apparatuses and are aggregated in a database of a server. Thus, it takes a long time to generate the virtual viewpoint image, which causes a delay in generating the virtual viewpoint.

Japanese Patent Application Laid-Open No. 2019-79468 discusses a technique for calculating a predicted virtual viewpoint based on a virtual viewpoint linked to a virtual viewpoint image, obtaining images to be used for generating the virtual viewpoint image corresponding to the predicted virtual viewpoint from a storage that stores images captured by a plurality of image capturing apparatuses, and generating the virtual viewpoint image based on the obtained images. According to the technique discussed in Japanese Patent Application Laid-Open No. 2019-79468, the time for generating the virtual viewpoint image can be reduced.

In the technique discussed in Japanese Patent Application Laid-Open No. 2019-79468, however, the images to be used for generating the virtual viewpoint image are determined based only on the prediction of the virtual viewpoint. Therefore, the virtual viewpoint image cannot be generated in some cases, if, for example there are a plurality of subjects located within an imaging capturing area (see, for example, FIG. 2).

SUMMARY OF THE DISCLOSURE

The present disclosure is directed to providing a technique for generating a virtual viewpoint image even when there is a plurality of subjects.

According to an aspect of the present disclosure, an image processing apparatus includes one or more memories storing instructions, and one or more processors executing the instructions to obtain virtual viewpoint information indicating a position and a direction of a virtual viewpoint, obtain a three-dimensional subject model to be generated based on captured images obtained by capturing with a plurality of image capturing apparatuses, predict a virtual viewpoint in a second frame subsequent to a first frame in a virtual viewpoint image based on a virtual viewpoint in a frame prior to the first frame, predict a position of the three-dimensional subject model in the second frame based on the position of the three-dimensional subject model corresponding to the frame prior to the first frame, determine an image capturing apparatus from which a captured image to be used for generating the second frame is obtained from among the plurality of image capturing apparatuses based on a predicted virtual viewpoint, a predicted position of the three-dimensional subject model, and image capturing parameters of the plurality of image capturing apparatuses, and generate the virtual viewpoint image based on a captured image corresponding to the second frame obtained from the determined image capturing apparatus, the three-dimensional subject model corresponding to the obtained second frame, and the virtual viewpoint information corresponding to the obtained second frame.

Further features of the present disclosure will become apparent from the following description of embodiments with reference to the attached drawings.

BRIEF DESCRIPTION OF THE DRAWINGS

FIG. 5 is a flowchart illustrating image processing according to the first embodiment.

FIG. 10 is a table illustrating an example of a priority of each image capturing apparatus.

FIG. 12 is a flowchart illustrating image processing according to the third embodiment.

DESCRIPTION OF THE EMBODIMENTS

Figure 1:
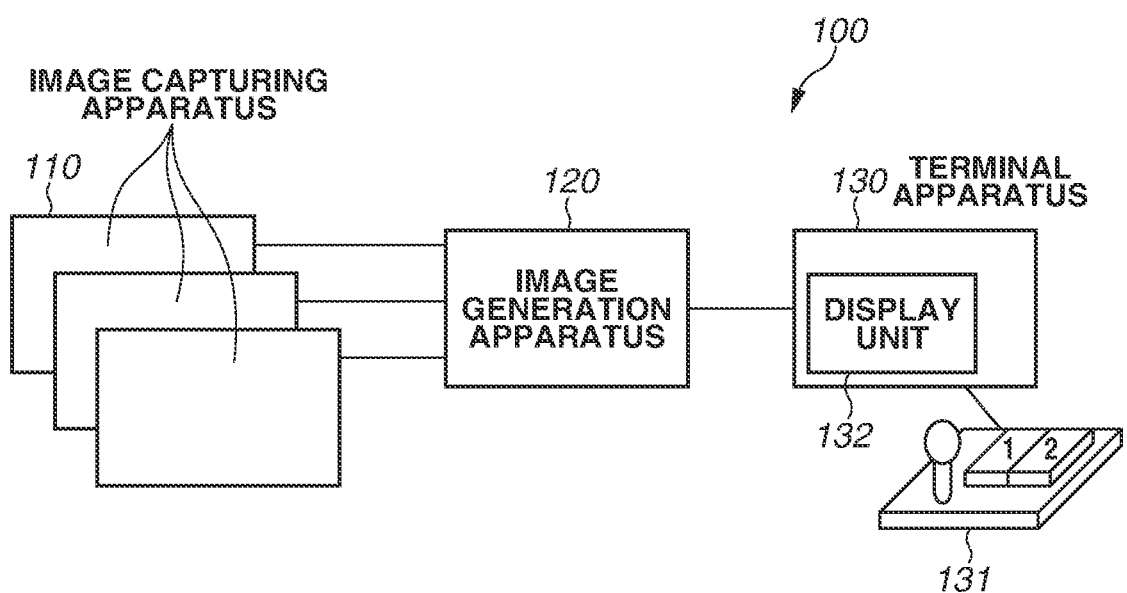
FIG. 1 is a block diagram illustrating a schematic configuration of an image processing system.

Embodiments of the present disclosure will be described below with reference to the drawings. The following embodiments are not intended to limit the present disclosure, and not all combinations of features described in the embodiments are necessarily deemed essential. The configurations of the embodiments can be appropriately modified or changed depending on the specifications of the apparatus to which the present disclosure is applied and various conditions (e.g., usage conditions, and usage environment). Some of the embodiments to be described below may be combined as appropriate. In the following embodiments, the same components or processes are denoted by the same reference numerals.

FIG. 1 is a block diagram illustrating a schematic configuration of an image processing system 100 according to the present embodiment.

The image processing system 100 includes a plurality of image capturing apparatuses 110, an image generation apparatus 120, and a terminal apparatus 130. The image capturing apparatuses 110 and the image generation apparatus 120 are connected via a communication cable, such as a local area network (LAN) cable. In the present embodiment, a LAN cable is used as the communication cable. However, the communication cable is not limited to this example. The connection among the apparatuses is not limited to the connection via the communication cable, but instead may be established via a wireless connection.

The plurality of image capturing apparatuses 110 are installed to surround a specific image capturing area at a predetermined image capturing location in a physical space. For example, each image capturing apparatus 110 is a digital camera configured to capture still images and moving images. In the following description, still images and moving images that are captured by the image capturing apparatuses 110 are collectively referred to as captured images, unless otherwise distinguished. In the present embodiment, each image capturing apparatus 110 is a digital camera that outputs a moving image including images corresponding to consecutive frames on a time axis.

Figure 2:
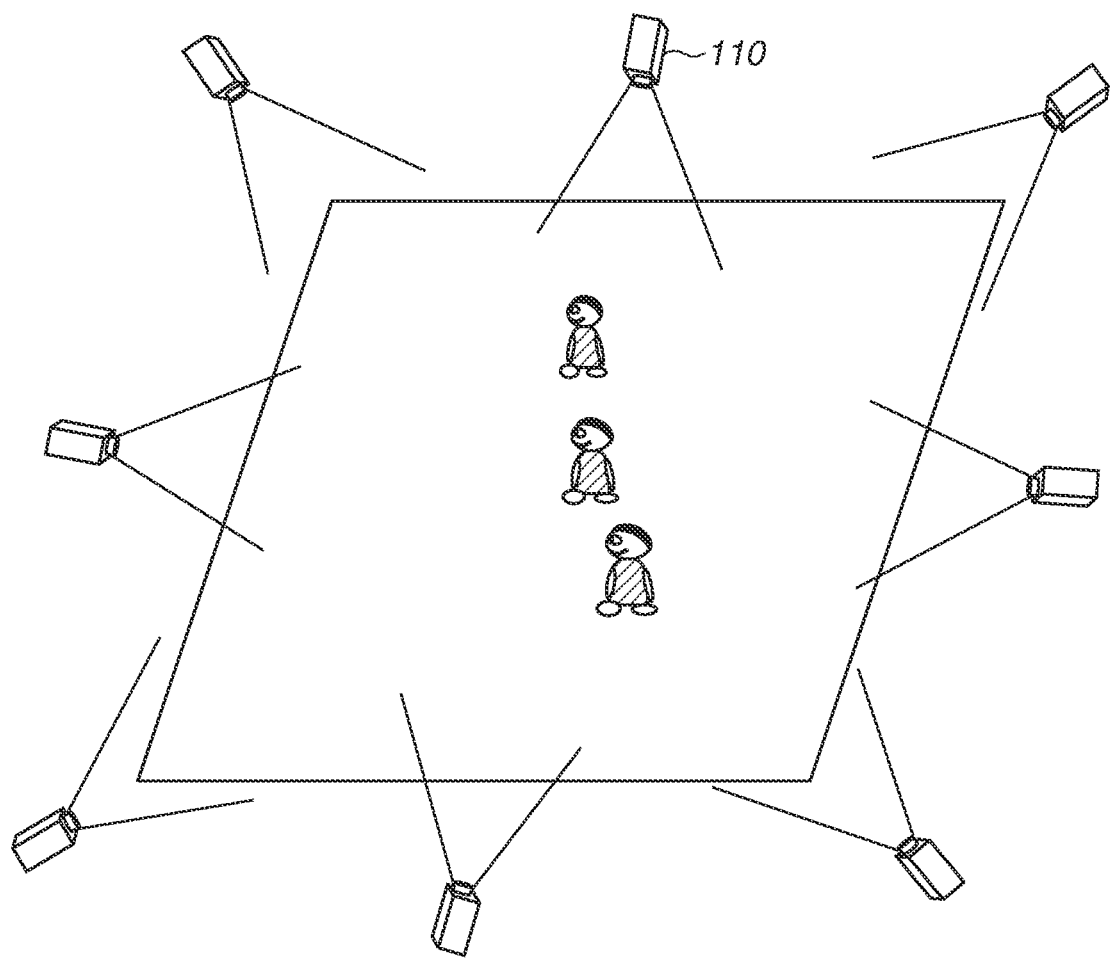
FIG. 2 illustrates an installation example of a plurality of image capturing apparatuses.

FIG. 2 illustrates a schematic installation example of the plurality of image capturing apparatuses 110. As illustrated in FIG. 2, the image capturing apparatuses 110 are installed to surround a specific image capturing area at a predetermined image capturing location, such as a photo studio, and capture images in the image capturing area. If there are subjects, such as persons, in the image capturing area, the captured image of the image capturing area includes an image of the subjects, such as persons, as a foreground image. The captured image also includes an image of a portion corresponding to the image capturing area in the photo studio as a background image.

The present embodiment illustrates an example where images of a plurality of subjects, such as persons, are obtained by capturing images of, for example, a dance scene in a photo studio. Captured image data obtained by each image capturing apparatus 110 is transmitted to the image generation apparatus 120. In the following description, image data to be handled inside the image capturing apparatuses 110, the image generation apparatus 120, and the terminal apparatus 130 is hereinafter simply referred to as an "image", unless otherwise specified.

The image generation apparatus 120 is an application example of an image processing apparatus according to the present embodiment. The image generation apparatus 120 accumulates a plurality of captured images transmitted from the plurality of image capturing apparatuses 110. The image generation apparatus 120 receives information corresponding to an operation instruction input from the terminal apparatus 130 of a user. In the present embodiment, the information corresponding to the operation instruction from the terminal apparatus 130 of the user includes at least virtual viewpoint information and playback time information to be described below. As described in detail below, if virtual viewpoint information and playback time information are input from the terminal apparatus 130, the image generation apparatus 120 generates a virtual viewpoint image based on the accumulated captured images and the virtual viewpoint information and the playback time information input from the terminal apparatus 130. In the present embodiment, it is assumed that the user of the terminal apparatus 130 is, for example, a video creator that creates a content including a virtual viewpoint image, or a viewer that is provided with the content. A video creator, a viewer, or the like is hereinafter referred to as a "user" without distinguishing them.

Here, the virtual viewpoint information is information indicating a direction or the like represented by a three-dimensional position and an angle of a virtually set viewpoint (hereinafter, virtual viewpoint) in a virtual space constructed of captured images. The virtual viewpoint information includes at least position information about relative positions with respect to an origin position, which is set at a predetermined position, such as the center of a photo studio, and direction information about directions from the origin position. The position information is position information about front and rear, left and right, and up and down with respect to the origin position. The direction information is direction information about angles around front and rear, left and right, and up and down. Since each virtual viewpoint is represented by three-dimensional positions, angles, and the like, a virtual viewpoint including three-dimensional positions, angles, and the like is hereinafter referred to as a "virtual viewpoint position". The term "playback time information" refers to time information indicating the time from when recording of a captured image is started. The user designates the playback time through the terminal apparatus 130, thereby enabling the image generation apparatus 120 to generate a virtual viewpoint image after the playback time.

The image generation apparatus 120 is, for example, a server apparatus, and includes a database function and an image processing function to be described below. A database of the image generation apparatus 120 accumulates the captured images transmitted from the plurality of image capturing apparatuses 110 in a manner linked to identifiers for identifying each of the image capturing apparatuses 110. In the present embodiment, the database holds images that are obtained by capturing images taken inside the photo studio with the image capturing apparatuses 110. In this case, the database holds, as a background image, an image obtained by capturing an image of the photo studio with the image capturing apparatuses 110 when there is no subject, such as a dancer, in the photo studio. The database also holds, as a foreground image, an object image of a specific subject obtained by separating the object image through image processing from an image of the photo studio captured by each image capturing apparatus 110 when there is a subject, such as a person, in the photo studio. Examples of the subject to be separated as an object image from the captured image include an object such as a person and an object whose properties are predetermined.

In the present embodiment, the image generation apparatus 120 generates the virtual viewpoint image corresponding to the virtual viewpoint information and playback time information based on the background image managed in the database and the object image of the subject. As a method for generating the virtual viewpoint image, model-based rendering (MBR) is used, for example. The MBR is a method of generating a virtual viewpoint image based on a three-dimensional model generated based on captured images obtained by capturing images of a subject in a plurality of directions. Specifically, MBR is a technique of generating an appearance of a scene from a virtual viewpoint using a three-dimensional model (three-dimensional shape) of a target scene obtained by a three-dimensional shape restoration method, such as a visual hull method and a multi-view-stereo (MVS) method. As the virtual viewpoint image generation method, any rendering method other than the MBR can be used. The virtual viewpoint image generated by the image generation apparatus 120 is transmitted to the terminal apparatus 130 via a LAN cable or the like.

The terminal apparatus 130 is, for example, a personal computer (PC) or a tablet terminal. In the present embodiment, a controller 131 is connected to the terminal apparatus 130. The controller 131 is composed of at least one of a mouse, a keyboard, a six-axis controller, and a touch panel, and is operated by the user. The terminal apparatus 130 displays the virtual viewpoint image received from the image generation apparatus 120 on a display unit 132. The terminal apparatus 130 converts a user operation input from the controller 131 into playback time information and virtual viewpoint position movement instruction (instruction about a movement amount and a movement direction) information, and transmits the information to the image generation apparatus 120. The playback time and the virtual viewpoint position movement instruction are not limited to the above-described playback time and continuous movement of the virtual viewpoint position. Examples of the movement of the virtual viewpoint position may include a movement to a predetermined virtual viewpoint position, such as a front position or a rear position of the subject, or a position that overlooks the subject, in the virtual space. The playback time and the virtual viewpoint position can be set in advance. In this case, a quick movement at the preliminarily set playback time or to the virtual viewpoint position can be performed, in response to an instruction from the user.

Figure 3:
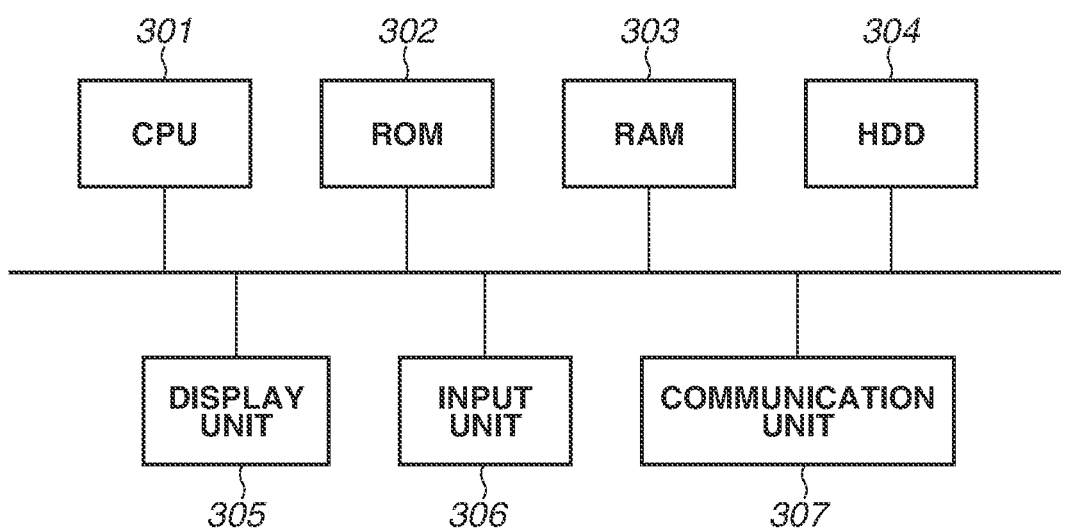
FIG. 3 is a block diagram illustrating a hardware configuration example of an image generation apparatus.

FIG. 3 is a block diagram illustrating a hardware configuration example of the image generation apparatus 120.

As illustrated in FIG. 3, the image generation apparatus 120 includes a central processing unit (CPU) 301, a read-only memory (ROM) 302, a random access memory (RAM) 303, a hard disk drive (HDD) 304, a display unit 305, an input unit 306, and a communication unit 307.

The CPU 301 reads out control programs stored in the ROM 302 and executes various control processing. The RAM 303 is used as a temporary storage area, such as a main memory or a work area for the CPU 301. The HDD 304 stores various programs including an image processing program according to the present embodiment, and various data including image data. The image processing program according to the present embodiment can be held in the ROM 302. The display unit 305 displays captured images, generated virtual viewpoint images, and various information. The input unit 306 includes a keyboard and a mouse and receives various operation instructions from the user. The communication unit 307 performs communication processing with external apparatuses, such as the image capturing apparatuses 110, via a network. Examples of the network include Ethernet®. In another example, the communication unit 307 can communicate with external apparatuses via wireless communication. In the present embodiment, the functions and processing to be described below in the image generation apparatus 120 are implemented by the CPU 301 reading out the image processing program stored in the HDD 304 or the ROM 302 and executing the image processing program. The hardware configuration of the terminal apparatus 130 is similar to the hardware configuration illustrated in FIG. 3, and thus the descriptions thereof are omitted.

Figure 4:
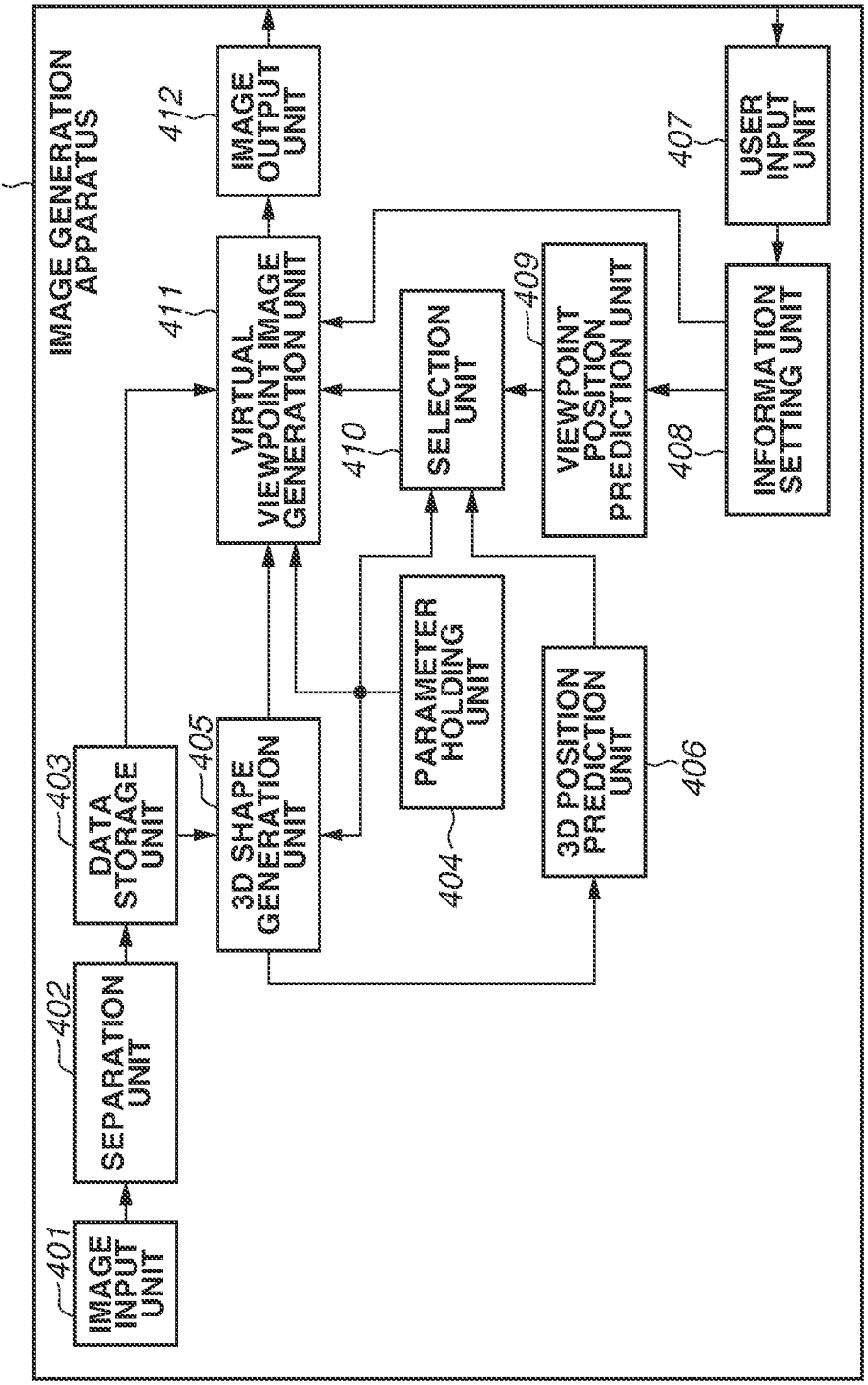
FIG. 4 is a block diagram illustrating a functional configuration of an image generation apparatus according to a first embodiment.

FIG. 4 is a block diagram illustrating a functional configuration of the image generation apparatus 120 according to a first embodiment.

An image input unit 401 converts a transmission signal input from each image capturing apparatus 110 via the LAN cable into captured image data, and outputs the captured image data to a separation unit 402.

If the captured image input from the image input unit 401 is an image obtained by capturing an image of a scene where no subject is present, or an image captured before a dance performance or the like is started, the separation unit 402 outputs the captured image as the background image to a data storage unit 403. If the captured image input from the image input unit 401 is an image obtained by capturing an image of a scene where a subject is present, or an image obtained by capturing an image of a scene where a dance performance or the like is performed, the separation unit 402 extracts an object image of the subject from the captured image. Further, the separation unit 402 outputs the object image of the subject extracted from the captured image as the foreground image to the data storage unit 403.

The data storage unit 403 is a database that stores the background image and the foreground image input from the separation unit 402. The data storage unit 403 outputs the foreground image to a three-dimensional shape generation unit 405 (hereinafter referred to as the 3D shape generation unit 405). The data storage unit 403 outputs the foreground image and the background image to a virtual viewpoint image generation unit 411. As described in detail below, the virtual viewpoint image generation unit 411 uses the foreground image and the background image to generate a virtual viewpoint image.

A parameter holding unit 404 preliminarily holds image capturing parameters of the image capturing apparatuses 110 installed to surround the specific image capturing area, such as the photo studio illustrated in FIG. 2. The image capturing parameters are parameters relating to the installation position and image capturing direction of each of the image capturing apparatuses 110, and image capturing setting information including a focal length and an exposure time of each of the image capturing apparatuses 110. The installation position of each image capturing apparatus 110 is a predetermined position. In the present embodiment, the image capturing parameters of the image capturing apparatuses 110 are hereinafter referred to as "camera parameters".

The parameter holding unit 404 outputs the camera parameters of the image capturing apparatuses 110 to the 3D shape generation unit 405, a selection unit 410, and the virtual viewpoint image generation unit 411.

The 3D shape generation unit 405 functions as a three-dimensional model generation unit that generates a three-dimensional subject model based on a plurality of images captured by the plurality of image capturing apparatuses 110 arranged at different positions in the physical space, and the camera parameters of the plurality of image capturing apparatuses 110. In the present embodiment, the 3D shape generation unit 405 estimates the three-dimensional subject model based on the foreground image read out from the data storage unit 403 and the camera parameters input from the parameter holding unit 404. The three-dimensional subject model has a three-dimensional shape that is hereinafter abbreviated as a 3D shape. The 3D shape generation unit 405 generates 3D shape information about the subject by using the three-dimensional shape restoration method, such as the visual hull method. The 3D shape generation unit 405 outputs the 3D shape information about the subject to a 3D position prediction unit 406 and the virtual viewpoint image generation unit 411.

The 3D position prediction unit 406 functions as a model prediction unit that predicts a position of the three-dimensional subject model in a second frame subsequent to a first frame on a time axis based on the three-dimensional subject model generated in a frame prior to the first frame among the frames that are consecutive on the time axis. For example, assume that the first frame is set as the current frame and the second frame is the frame subsequent to the current frame. In the present embodiment, the 3D position prediction unit 406 predicts the 3D shape and the position of the 3D shape in the next frame, or a subject predicted position in the next frame, based on 3D shape information on a plurality of frames corresponding to a predetermined period prior to the current frame input from the 3D shape generation unit 405. More specifically, the 3D position prediction unit 406 calculates a movement change amount of the 3D shape between two frames prior to the current frame, and further calculates a moving speed of the 3D shape based on the movement change amount of the 3D shape. Further, the 3D position prediction unit 406 estimates the 3D shape and the predicted position of the 3D shape in the next frame based on the moving speed of the 3D shape. The estimated 3D shape and predicted position are hereinafter referred to as a 3D shape predicted position. The 3D position prediction unit 406 outputs information about the 3D shape predicted position to the selection unit 410.

A user input unit 407 converts a transmission signal transmitted from the terminal apparatus 130 via the LAN cable into user input data. If playback time information and virtual viewpoint information are input as the user input data, the user input unit 407 outputs the playback time information and the virtual viewpoint information to an information setting unit 408.

The information setting unit 408 functions as an information obtaining unit that obtains virtual viewpoint information indicating a position and a direction of a virtual viewpoint. In the present embodiment, the information setting unit 408 updates the current position of the virtual viewpoint and the direction of the virtual viewpoint in the virtual space and the playback time, based on the playback time information and the virtual viewpoint information received from the user input unit 407. Thereafter, the information setting unit 408 outputs the playback time information and the virtual viewpoint information to a viewpoint position prediction unit 409 and the virtual viewpoint image generation unit 411. As the origin of the virtual space, the center of the photo studio or the like is set in advance.

The viewpoint position prediction unit 409 predicts the position and direction of the virtual viewpoint in the second frame subsequent to the first frame on the time axis, based on the position and direction of the virtual viewpoint in a frame prior to the first frame among the frames that are consecutive on the time axis. Specifically, when the first frame is set as the current frame and the second frame is set as the next frame, the viewpoint position prediction unit 409 predicts the position and direction of the virtual viewpoint in the next frame, based on virtual viewpoint information corresponding to a plurality of frames obtained from a predetermined period prior to the current frame obtained from the information setting unit 408. Hereinafter, the position and direction of the virtual viewpoint predicted by the viewpoint position prediction unit 409 are collectively referred to as a virtual viewpoint predicted position. In the present embodiment, the viewpoint position prediction unit 409 calculates the movement change amount of a specific virtual viewpoint between two frames prior to the current frame, and further calculates the moving speed of the specific virtual viewpoint, based on the movement change amount of the specific virtual viewpoint. Further, the viewpoint position prediction unit 409 estimates the virtual viewpoint predicted position indicating the position and direction of the virtual viewpoint in the next frame, based on the moving speed of the virtual viewpoint. The viewpoint position prediction unit 409 outputs information about the virtual viewpoint predicted position to the selection unit 410.

The selection unit 410 determines the image capturing apparatus 110 from which a captured image to be used for generating the virtual viewpoint image for the second frame is obtained, based on the virtual viewpoint predicted position predicted by the viewpoint position prediction unit 409, the 3D shape predicted position predicted by the 3D position prediction unit 406, and the camera parameters. Specifically, when the first frame is set as the current frame and the second frame is set as the next frame, the selection unit 410 selects the image capturing apparatus 110 that has captured the image to be used for rendering processing on the subject at the next frame time, based on the 3D shape predicted position, the virtual viewpoint predicted position, and the camera parameters. The selection unit 410 outputs the identifier and the like of the determined image capturing apparatus 110 as image capturing apparatus selection information to the virtual viewpoint image generation unit 411.

In the present embodiment, the selection unit 410 determines the visibility of a 3D shape when an image of the 3D shape predicted position is captured from the virtual viewpoint predicted position, and selects the image capturing apparatus 110 located near the viewpoint predicted position from among the image capturing apparatuses 110 where it is determined that the 3D shape is visible. In other words, the selection unit 410 selects the image capturing apparatus 110 located near the virtual viewpoint predicted position from among the image capturing apparatuses 110 where the 3D shape predicted position is visible from the virtual viewpoint predicted position. Further, the selection unit 410 determines the identifier of the selected image capturing apparatus 110. Thus, the virtual viewpoint image generation unit 411 obtains the image captured by the image capturing apparatus 110 identified by the identifier. In the case of selecting the image capturing apparatus 110 located near the virtual viewpoint predicted position, at least one of the plurality of image capturing apparatuses 110 used for image capturing is selected. For example, a predetermined number of two or more image capturing apparatuses 110 can be selected as the image capturing apparatus 110 located near the virtual viewpoint predicted position. In this case, the virtual viewpoint image generation unit 411 obtains a combined image of pixels in the captured images obtained from the predetermined number of image capturing apparatuses 110.

The virtual viewpoint image generation unit 411 generates the virtual viewpoint image for the second frame, based on the captured image obtained from the image capturing apparatus 110 determined by the selection unit 410, the camera parameters of the determined image capturing apparatus 110, the 3D model generated by the 3D shape generation unit 405, and the virtual viewpoint information received from the information setting unit 408. In other words, the virtual viewpoint image generation unit 411 performs rendering processing, based on the virtual viewpoint information, the image capturing apparatus selection information, the captured images read out from the data storage unit 403 based on the image capturing apparatus selection information, and the 3D shape information, to thereby generate the virtual viewpoint image. For example, the virtual viewpoint image generation unit 411 performs rendering processing (coloring processing) using color information corresponding to the image captured by the image capturing apparatus 110 at the time corresponding to the playback time, on the 3D shape of the subject viewed from the virtual viewpoint position. When the installation position of the image capturing apparatus 110 falls within a range where the 3D shape is visible from the virtual viewpoint position, that is, in a state where the subject based on the 3D shape is visible from the virtual viewpoint, the color of the foreground image extracted from the captured image obtained from the image capturing apparatus 110 is used as the color of the 3D shape. The virtual viewpoint image generation unit 411 combines the image of the subject based on the virtual viewpoint position with the background image to thereby generate the virtual viewpoint image. The virtual viewpoint image generated by the rendering processing performed as described above in the virtual viewpoint image generation unit 411 is transmitted to an image output unit 412.

The image output unit 412 converts the virtual viewpoint image received from the virtual viewpoint image generation unit 411 into a transmission signal that can be transmitted to the terminal apparatus 130, and outputs the transmission signal to the terminal apparatus 130.

An operation of the image generation apparatus 120 will now be described with reference to FIG. 5. FIG. 5 is a flowchart illustrating an image processing flow in the image generation apparatus 120 according to the first embodiment.

In step S501, the image input unit 401 determines whether image capturing is started in each of the plurality of image capturing apparatuses 110 and the captured images are input from the image capturing apparatuses 110. If the captured image from any one of the image capturing apparatuses 110 is not input (NO in step S501), the image input unit 401 waits for the input. If the captured images from the image capturing apparatuses 110 are input (YES in step S501), the image input unit 401 outputs the captured images to the separation unit 402. The processing then proceeds to step S502.

In step S502, when the captured image is a captured image of a scene where no subject is present, the separation unit 402 outputs the captured image to the data storage unit 403 as the background image. When the captured image is a captured image of a scene where a subject is present, the separation unit 402 extracts an object image of the subject from the captured image, and outputs the object image as the foreground image to the data storage unit 403.

In step S503, the data storage unit 403 holds the foreground image and the background image transmitted from the separation unit 402.

In step S504, the 3D shape generation unit 405 generates 3D shape information about the subject, based on camera parameters received from the parameter holding unit 404 and the foreground image read out from the data storage unit 403. The 3D shape generation unit 405 generates 3D shape information about the subject by using the three-dimensional shape restoration method, such as the visual hull method as described above. In this case, the 3D shape information about the subject is composed of a plurality of point groups, and each point includes position information.

In step S505, the information setting unit 408 determines whether a virtual camera path including playback time information and virtual viewpoint information is input via the user input unit 407. The term "virtual camera path" refers to virtual viewpoint information indicating a position and a direction (orientation) in each frame at the virtual viewpoint position. The virtual camera path is a set (row) of virtual camera parameters at the virtual viewpoint position in each frame. For example, information corresponding to one second in the setting of a frame rate of 60 frames/second indicates a row of virtual camera parameters in the positions and directions of 60 virtual viewpoints. If the virtual camera path is not input (NO in step S505), the information setting unit 408 waits for the input. If the virtual camera path is input (YES in step S505), the information setting unit 408 outputs the virtual camera path to the viewpoint position prediction unit 409.

In step S506, the viewpoint position prediction unit 409 predicts a virtual viewpoint position in the next frame. For example, when the frame corresponding to the playback time at the current time is set as the current frame, the viewpoint position prediction unit 409 calculates the moving speed of the virtual viewpoint, based on the movement change amount of the virtual viewpoint between two frames prior to the current frame. The viewpoint position prediction unit 409 further determines the virtual viewpoint predicted position in the next frame, based on the moving speed. The viewpoint position prediction unit 409 can calculate the moving speed of the virtual viewpoint and an acceleration based on the moving speed of the virtual viewpoint. The viewpoint position prediction unit 409 can then calculate the virtual viewpoint predicted position using information about the acceleration.

In step S507, the 3D position prediction unit 406 predicts the 3D shape position in the next frame based on information about the 3D shape corresponding to a predetermined period input from the 3D shape generation unit 405. In other words, the 3D position prediction unit 406 generates the subject predicted position in the next frame. For example, when the frame corresponding to the playback time at the current time is set as the current frame, the 3D position prediction unit 406 calculates the movement change amount of the 3D shape between two frames prior to the current frame, and further calculates the moving speed of the 3D shape based on the movement change amount. Further, the 3D position prediction unit 406 determines the 3D shape predicted position in the next frame, based on the moving speed. The 3D position prediction unit 406 can calculate the moving speed of the 3D shape and an acceleration based on the moving speed. The 3D position prediction unit 406 can then calculate the position of the 3D shape using information about the acceleration.

In step S508, the selection unit 410 determines the image capturing apparatus 110 that has captured the image to be used for rendering processing on the subject at the next frame time, based on the 3D shape predicted position, the virtual viewpoint predicted position, and the camera parameters. The selection unit 410 then outputs the image capturing apparatus selection information including the identifier of the selected image capturing apparatus 110 to the virtual viewpoint image generation unit 411.

In step S509, the virtual viewpoint image generation unit 411 starts to receive the captured image for the next frame, based on the image capturing apparatus selection information input from the selection unit 410.

In step S510, the virtual viewpoint image generation unit 411 determines whether the virtual viewpoint information for the next frame is input from the information setting unit 408, or determines whether the virtual camera path for the next frame is input. If the virtual viewpoint information for the next frame is not input (NO in step S510), the virtual viewpoint image generation unit 411 waits for the input. If the virtual viewpoint information for the next frame is input (YES in step S510), the processing proceeds to step S511.

In step S511, the virtual viewpoint image generation unit 411 generates a virtual viewpoint image as a viewpoint image viewed from the virtual viewpoint position in the next frame. Specifically, the virtual viewpoint image generation unit 411 performs rendering processing based on the captured image for the next frame read out from the data storage unit 403 in step S509 and the 3D shape information received from the 3D shape generation unit 405, based on the image capturing apparatus selection information obtained in step S508. The virtual viewpoint image generation unit 411 then outputs the virtual viewpoint image generated in the rendering processing to the image output unit 412.

Figure 6A:
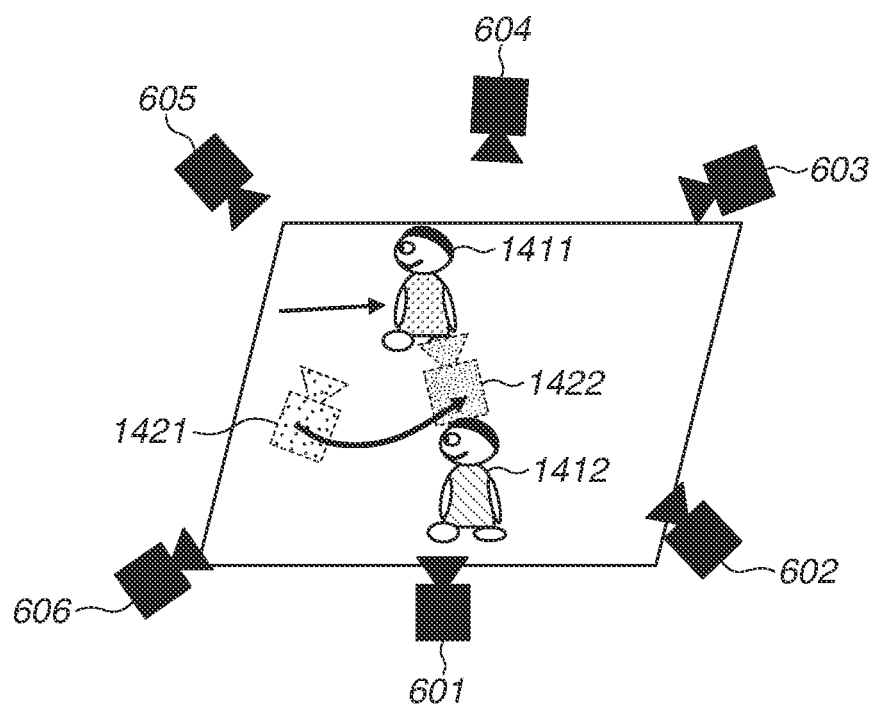
FIGS. 6A and 6B are conceptual diagrams each illustrating a virtual space according to the first embodiment.
Figure 6B:
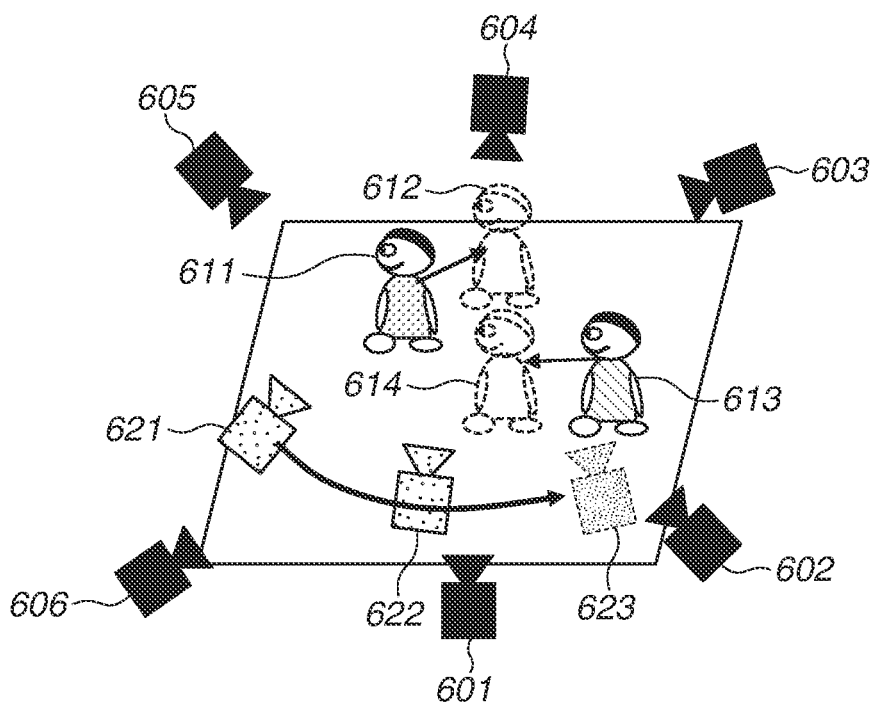

FIGS. 6A and 6B are conceptual diagrams each illustrating a positional relationship between each subject shape predicted in the virtual space and the predicted virtual viewpoint position in the virtual space. In examples illustrated in FIGS. 6A and 6B, only six image capturing apparatuses 601 to 606 that are selected from among the eight image capturing apparatuses 110 illustrated in FIG. 2 are illustrated for ease of illustration and description.

FIG. 6A illustrates an example where image processing according to the present embodiment is not performed. FIG. 6A illustrates the image capturing apparatuses 601 to 606 actually arranged in a linked manner in the virtual space, subjects 1411 and 1412 that are linked to each other in the virtual space, a virtual viewpoint position 1421, and a virtual viewpoint predicted position 1422. For example, assuming that an image of the subject 1411 is captured at the virtual viewpoint predicted position 1422, captured images obtained from the image capturing apparatus 601 and the image capturing apparatus 602 are used based on the prediction of the virtual viewpoint position. However, in a case where image processing according to the present embodiment is not performed, the subject 1411 overlaps the subject 1412 as viewed from the image capturing apparatus 601 and is not visible, which may make it difficult to color the subject 1411 in the captured image obtained from the image capturing apparatus 601.

The image generation apparatus 120 according to the present embodiment therefore determines the position of the image capturing apparatus, which captures the image to be used for generating the virtual viewpoint image, based on the virtual viewpoint predicted position, the 3D shape predicted position as the predicted subject position, and the camera parameters. This configuration enables the image generation apparatus 120 according to the present embodiment to generate the colored virtual viewpoint image even when a plurality of subjects is present. The image generation apparatus 120 according to the present embodiment predicts the virtual viewpoint and the 3D shape, thereby making it possible to reduce the time for generating the virtual viewpoint image.

FIG. 6B illustrates an example where image processing according to the present embodiment is performed in the image generation apparatus 120. FIG. 6B illustrates the image capturing apparatuses 601 to 606 that are arranged in a linked manner in the virtual space, like in the example of FIG. 6A. A virtual viewpoint position 622 indicates the position and direction of the virtual viewpoint corresponding to the playback time information and virtual viewpoint information input from the user input unit 407. A virtual viewpoint position 621 indicates the position and direction of the virtual viewpoint in the previous frame, and a virtual viewpoint predicted position 623 indicates the virtual viewpoint predicted position indicating the position and direction of the virtual viewpoint predicted in the next frame. FIG. 6B also illustrates a 3D shape predicted position 612 indicating a 3D shape predicted position predicted in the next frame for a 3D shape 611 of the subject linked in the virtual space. A 3D shape predicted position 614 indicates a 3D shape predicted position predicted in the next frame for a 3D shape 613 of the subject. Specifically, as illustrated in FIG. 6B, for example, in the case of capturing images of the 3D shape predicted position 612 and the 3D shape predicted position 614 from the virtual viewpoint predicted position 623, the use of the captured images obtained from the image capturing apparatuses 601 and 602 enables rendering processing for the 3D shape predicted position 614. In contrast, as viewed from the image capturing apparatus 601, the 3D shape predicted position 612 overlaps the 3D shape predicted position 614, which results in deterioration of visibility. The rendering processing is thus performed on the 3D shape predicted position 612 using the captured images obtained from the image capturing apparatuses 602 and 606, without using the captured image obtained from the image capturing apparatus 601 for the 3D shape predicted position 612. In other words, the image generation apparatus 120 uses the captured images obtained from the image capturing apparatuses 601, 602, and 606 to perform rendering processing after the next frame time.

Figure 7:
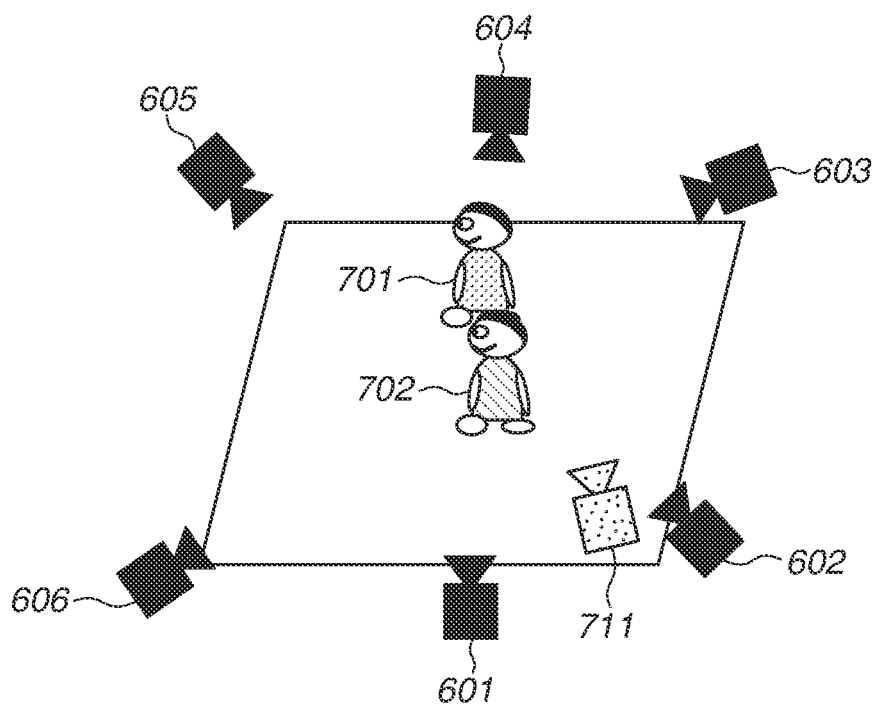
FIG. 7 is a conceptual diagram illustrating the virtual space after a lapse of one frame time.

FIG. 7 is a conceptual diagram illustrating a positional relationship between each subject shape that has actually moved after the time of the next frame and the virtual viewpoint position, in the virtual space. FIG. 7 illustrates the image capturing apparatus 601 to 606 that are arranged in a linked manner in the virtual space, like in the examples illustrated in FIGS. 6A and 6B. FIG. 7 also illustrates 3D shapes 701 and 702 of the subjects that are linked to each other in the virtual space, and a virtual viewpoint position 711 based on the virtual viewpoint information input from the user. The virtual viewpoint position 711 does not necessarily match the virtual viewpoint predicted position 623 based on the prediction described above with reference to FIG. 6B. In contrast, the image capturing apparatuses selected based on the virtual viewpoint prediction and the subject prediction match the image capturing apparatuses determined based on the virtual viewpoint position based on a user input at the next frame time and the actual subject position. Thus, even in a case where the subject or the like has actually moved, rendering processing can be performed on the subject shape, accordingly.

According to the first embodiment, when a plurality of subjects are present, the image capturing apparatuses to be used for rendering processing on the next frame are selected based on the 3D shape predicted position, the virtual viewpoint predicted position, and the camera parameters, as described above. According to the first embodiment, the virtual viewpoint image can thereby be generated even when a plurality of subjects is present. A delay period from a user input to display of the virtual viewpoint image can also be shortened and real-time display can be achieved. Furthermore, according to the first embodiment, the use of images captured by the selected image capturing apparatuses makes it possible to reduce the amount of image data to be used, reduce the communication bandwidth to be used, and reduce the amount of processing.

A second embodiment illustrates an example where a priority order is set for each of the image capturing apparatuses from which captured images are obtained based on the 3D shape predicted position, the virtual viewpoint predicted position, and camera parameters. In this case, the captured images are obtained from the image capturing apparatuses based on the priority order, as explained below.

Figure 8:
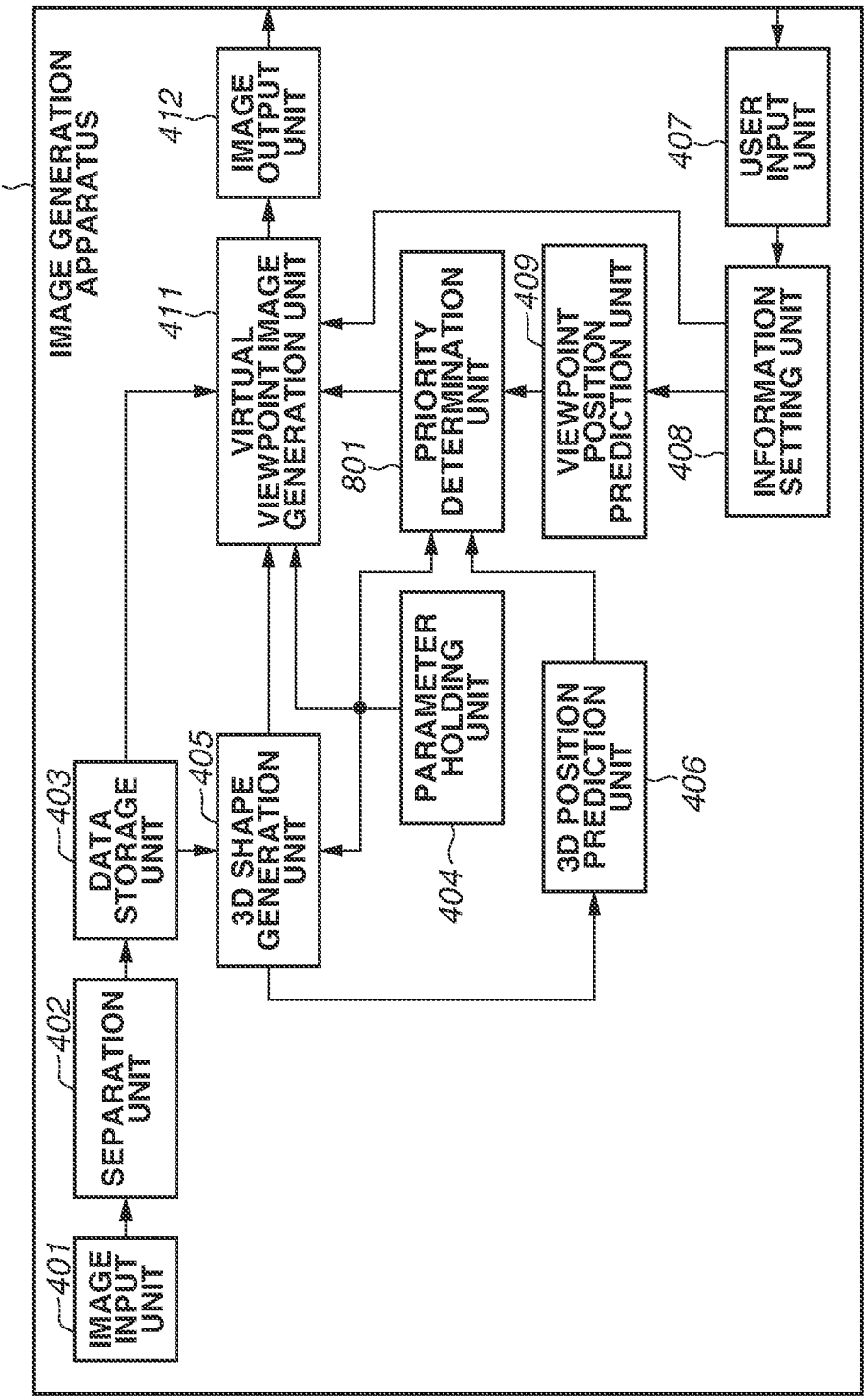
FIG. 8 is a block diagram illustrating a functional configuration of an image generation apparatus according to a second embodiment.

FIG. 8 is a block diagram illustrating a functional configuration example of an image generation apparatus 800 according to the second embodiment. The image generation apparatus 800 according to the second embodiment includes a priority determination unit 801 in place of the selection unit 410 in the image generation apparatus 120 according to the first embodiment illustrated in FIG. 4. The priority determination unit 801 receives 3D shape predicted position information from the 3D position prediction unit 406, receives virtual viewpoint predicted position information from the viewpoint position prediction unit 409, and receives camera parameters from the parameter holding unit 404. The functional units other than the priority determination unit 801 are substantially the same as the corresponding functional units of the first embodiment described above, and thus the descriptions thereof are omitted. Only differences from the first embodiment will be described below.

The priority determination unit 801 increases the priority (priority order) of each of the image capturing apparatuses that have captured the image to be used for rendering processing on the subject at the next frame time, based on the 3D shape predicted position, the virtual viewpoint predicted position, and the camera parameters. The priority determination unit 801 also decreases the priority of each of the other image capturing apparatuses. For example, the priority determination unit 801 determines the visibility of a 3D shape when an image of the 3D shape predicted position is captured from the virtual viewpoint predicted position. The priority determination unit 801 increases the priority of the image capturing apparatus located closer to the virtual viewpoint predicted position among the image capturing apparatuses where it is determined that the 3D shape predicted position is visible. The priority determination unit 801 decreases, in contrast, the priority of the image capturing apparatus located farther from the virtual viewpoint predicted position. In consideration that the virtual viewpoint position moves to a preliminarily set predetermined virtual viewpoint position, the priority of the image capturing apparatus located closer to the predetermined virtual viewpoint position can be increased. The priority determination unit 801 outputs the priority determined for each image capturing apparatus and priority information linked to the identifier of each image capturing apparatus, to the virtual viewpoint image generation unit 411. With this configuration, the virtual viewpoint image generation unit 411 obtains the captured images from the image capturing apparatuses based on the priority.

Figure 9:
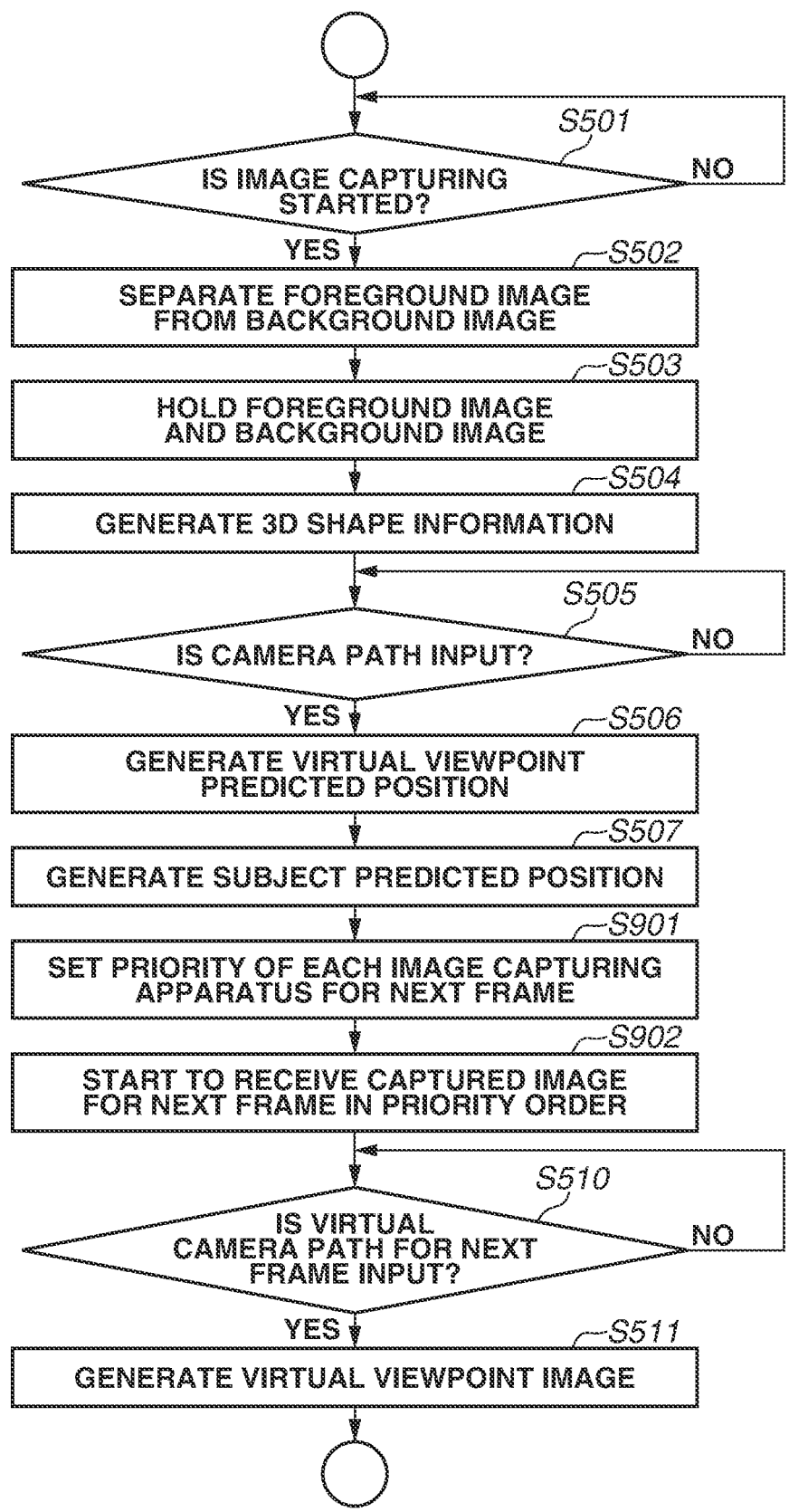
FIG. 9 is a flowchart illustrating image processing according to the second embodiment.

FIG. 9 is a flowchart illustrating image processing to be executed by the image generation apparatus 800 according to the second embodiment. Processing of steps S501 to S507 and steps S510 to S511 is similar to the processing of corresponding steps in the flowchart illustrated in FIG. 5, and thus the descriptions thereof are omitted. In the flowchart illustrated in FIG. 9, the processing proceeds to step S901 after the processing of step S507, and the processing proceeds to step S510 after the processing of step S902.

In step S901, the priority determination unit 801 sets the priority for each image capturing apparatus based on the 3D shape predicted position, the virtual viewpoint predicted position, and the camera parameters. Specifically, the priority determination unit 801 increases the priority of the image capturing apparatus that has captured the image to be used for rendering processing on the subject at the next frame time, decreases the priority of each of the other image capturing apparatuses, and outputs the priority information linked to the identifier of each image capturing apparatus to the virtual viewpoint image generation unit 411.

In step S902, the virtual viewpoint image generation unit 411 starts to receive the captured image for the next frame in order from the image captured by the image capturing apparatus with a high priority based on the priority information input from the priority determination unit 801. The priorities can be assigned to all image capturing apparatuses, and a priority range of priorities based on which captured images are to be actually obtained can be designated. In this case, the virtual viewpoint image generation unit 411 can obtain captured images in descending order of priority from the image capturing apparatuses to which any one of the priorities within the priority range is assigned. For example, the priorities are not necessarily assigned to all the image capturing apparatuses. In this case, the virtual viewpoint image generation unit 411 can obtain captured images in descending order of priority from the captured images obtained from the image capturing apparatuses to which the priority is assigned.

FIG. 10 is a table illustrating an example where the priority is set for each image capturing apparatus based on the 3D shape predicted position and the virtual viewpoint predicted position. The priority is assigned in a manner linked to the identifier of each image capturing apparatus, and the image capturing apparatuses are arranged based on the priority order. FIG. 10 illustrates an example where the priorities are assigned to the image capturing apparatuses 601 to 606, for example, based on the positional relationship between the subjects and virtual viewpoints illustrated in FIG. 6B. In the example illustrated in FIG. 10, the numbers 601 to 606 assigned to the image capturing apparatuses are used as the identifiers of the respective image capturing apparatuses. In the case of the 3D shape predicted position and the virtual viewpoint predicted position as illustrated in FIG. 6B, the image capturing apparatus 602 is determined to have priority "1" because the image capturing apparatus 602 is the closest to the virtual viewpoint predicted position 623, and the image capturing apparatus 601 is determined to have priority "2" because the image capturing apparatus 601 is the second closest to the image capturing apparatus 602.

Further, the image capturing apparatus 606 is determined to be located at the position that may be desirably used for rendering processing on the 3D shape predicted position 612, and is thus determined to have priority "3". If the priority of the image capturing apparatus 604 located near the predetermined virtual viewpoint position is also increased in consideration that the virtual viewpoint position moves to the preliminarily set predetermined virtual viewpoint position, the image capturing apparatus 604 is determined to have priority "4". In contrast, the image capturing apparatus 603 located at a position where the virtual viewpoint position is less likely to move at the next frame time is determined to have priority "5". The image capturing apparatus 605 located at a position where the virtual viewpoint position is much less likely to move at the next frame time is determined to have priority "6".

As described above, according to the second embodiment, the captured images are obtained from the image capturing apparatuses based on the priority order, thereby making it possible to preferentially use the captured image to be used for the virtual viewpoint position at the next frame time, which leads to a reduction in a delay period for generating the virtual viewpoint image. In the second embodiment, the captured images with lower priorities can also be sequentially obtained if there is an extra transmission bandwidth or the like for captured images, for example. This makes it possible to deal with the movement to the predetermined virtual viewpoint position and deal with the case where the virtual viewpoint predicted position is different from the actual virtual viewpoint position.

A third embodiment illustrates an example where the number of image capturing apparatuses from which captured images are obtained is changed based on the 3D shape predicted position and the moving speed of a virtual viewpoint used to generate the virtual viewpoint predicted position.

Figure 11:
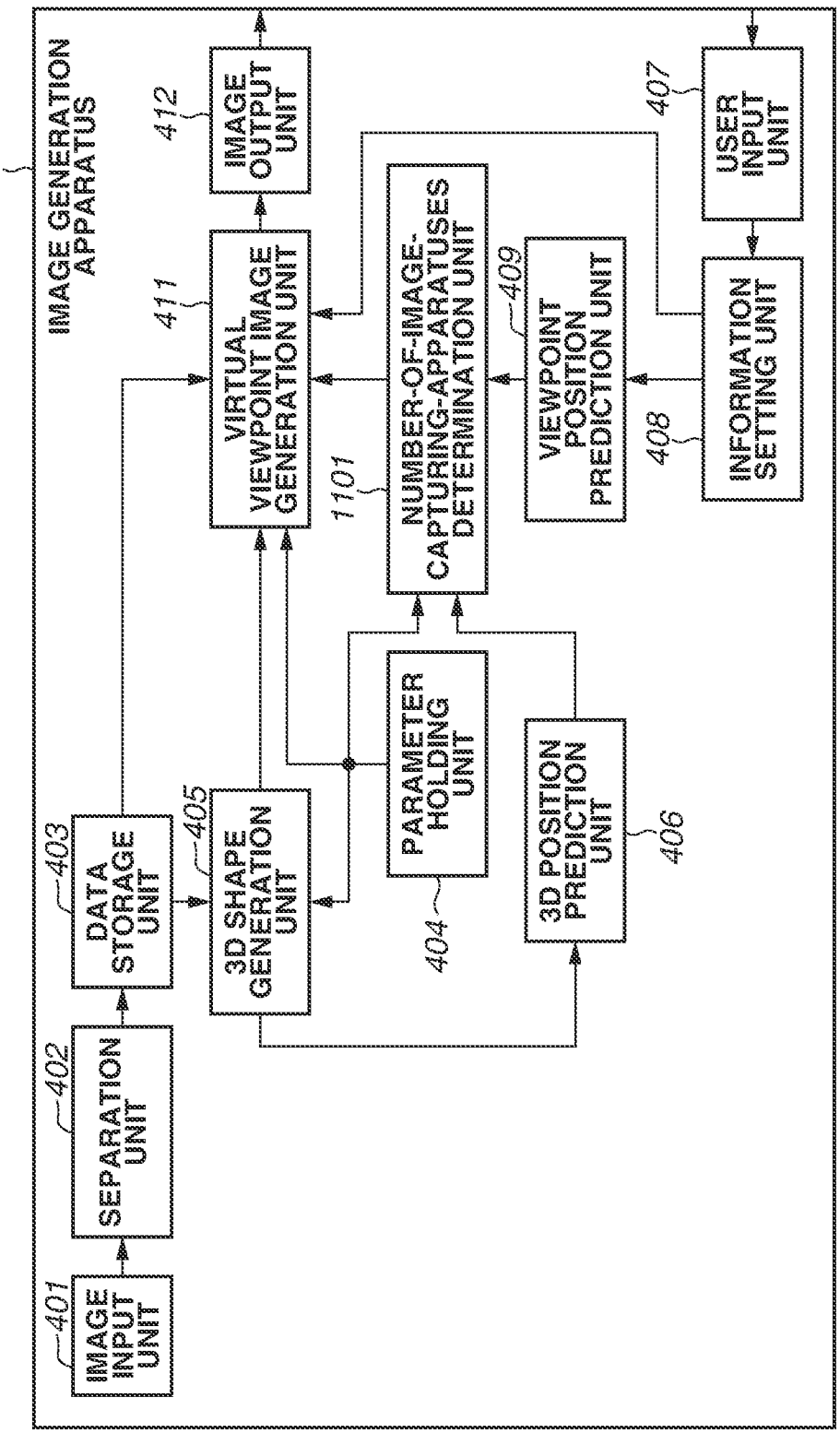
FIG. 11 is a block diagram illustrating a functional configuration of an image generation apparatus according to a third embodiment.

FIG. 11 is a block diagram illustrating a functional configuration example of an image processing apparatus according to the third embodiment. An image generation apparatuses 1100 according to the third embodiment includes a number-of-image-capturing-apparatuses determination unit 1101 in place of the selection unit 410 in the image generation apparatus 120 according to the first embodiment illustrated in FIG. 4. The number-of-image-capturing-apparatuses determination unit 1101 receives 3D shape predicted position information from the 3D position prediction unit 406, receives information about the virtual viewpoint predicted position and the moving speed of a virtual viewpoint from the viewpoint position prediction unit 409, and receives camera parameters from the parameter holding unit 404. The functional units other than the number-of-image-capturing-apparatuses determination unit 1101 are similar to the corresponding functional units of the first embodiment described above, and thus the descriptions thereof are omitted. Only differences from the first embodiment will be described below.

The number-of-image-capturing-apparatuses determination unit 1101 determines the number of image capturing apparatuses that have captured images to be used for rendering processing on the subject at the next frame time, based on the 3D shape predicted position, the virtual viewpoint predicted position, the moving speed of the virtual viewpoint, and the camera parameters. The number-of-image-capturing-apparatuses determination unit 1101 outputs the identifier for each of the determined number of image capturing apparatuses to the virtual viewpoint image generation unit 411.

In the third embodiment, in the case of calculating the predicted position of the virtual viewpoint, the viewpoint position prediction unit 409 calculates the moving speed of the virtual viewpoint, based on the virtual viewpoint position in two frames prior to the current frame in the same manner as described above. In this case, the virtual viewpoint predicted position may pass the virtual viewpoint position to be accurately predicted and may be located farther from the virtual viewpoint position if the moving speed of the virtual viewpoint is higher than the speed (e.g., 3 m/s) at which it is assumed that a human set as a main subject starts to run, for example. In contrast, the virtual viewpoint predicted position may stop before reaching the virtual viewpoint position to be accurately predicted. In other words, there may be a difference between the virtual viewpoint predicted position obtained by the viewpoint position prediction unit 409 and the virtual viewpoint position to be accurately predicted. If there is a large difference between the virtual viewpoint predicted position and the virtual viewpoint position to be accurately predicted, the selected image capturing apparatus may be different from the image capturing apparatus to be used at the virtual viewpoint position in the case of selecting the image capturing apparatus based on the prediction as described above in the first embodiment.

In the third embodiment, the number-of-image-capturing-apparatuses determination unit 1101 determines the number of image capturing apparatuses from which captured images are obtained based on the 3D shape predicted position, the camera parameters, the virtual viewpoint predicted position, and the moving speed of the virtual viewpoint. Specifically, the number-of-image-capturing-apparatuses determination unit 1101 increases the number of image capturing apparatuses from which captured images are obtained as the moving speed of the virtual viewpoint is higher than a predetermined set speed. The predetermined set speed is, for example, the speed (e.g., 3 m/s) determined assuming that a human set as a main subject starts to run. For example, if the number of image capturing apparatuses from which the captured image to be used for generating the virtual viewpoint image is obtained is set to a predetermined number (e.g., three), the number-of-image-capturing-apparatuses determination unit 1101 changes the number of image capturing apparatuses to a number greater than the predetermined number when the moving speed of the virtual viewpoint is higher than the set speed.

For example, even when the moving speed of the virtual viewpoint is less than or equal to the set speed, the virtual viewpoint predicted position may pass the virtual viewpoint position to be accurately predicted and may be located farther from the virtual viewpoint position, or may stop before reaching the virtual viewpoint position to be accurately predicted. However, it is considered that the difference between the virtual viewpoint predicted position and the virtual viewpoint position to be accurately predicted decreases as the moving speed of the virtual viewpoint decreases. In other words, it is assumed that the difference between the number of image capturing apparatuses to be used at the virtual viewpoint position and the predetermined number decreases as the moving speed of the virtual viewpoint decreases. The number-of-image-capturing-apparatuses determination unit 1101 therefore sets the number of image capturing apparatuses from which the captured image is obtained to the predetermined number if the moving speed of the virtual viewpoint is less than or equal to the predetermined set speed. While the present embodiment illustrates an example where the number of image capturing apparatuses from which the captured image is obtained is set to the predetermined number, the number-of-image-capturing-apparatuses determination unit 1101 can change the number of image capturing apparatuses from which the captured image is obtained to be decreased as the moving speed of the virtual viewpoint decreases.

As described above, in the third embodiment, the number of image capturing apparatuses from which the captured image is obtained is changed depending on the moving speed of the virtual viewpoint, thereby making it possible to deal with variations in the difference between the virtual viewpoint predicted position and the virtual viewpoint position to be accurately predicted. While the present embodiment illustrates an example where the moving speed of the virtual viewpoint is used, the number of image capturing apparatuses can be determined based on the acceleration of the movement of the virtual viewpoint in the case of calculating the acceleration based on the moving speed of the virtual viewpoint and then calculating the virtual viewpoint predicted position.

In the third embodiment, the number-of-image-capturing-apparatuses determination unit 1101 determines the visibility of a 3D shape when the determined number of image capturing apparatuses described above capture images of the 3D shape predicted position. The number-of-image-capturing-apparatuses determination unit 1101 also selects the image capturing apparatus located near the virtual viewpoint predicted position from among the image capturing apparatuses where it is determined that the 3D shape predicted position is visible, and determines the identifier of the selected image capturing apparatus. With this configuration, the virtual viewpoint image generation unit 411 obtains the image captured by the image capturing apparatus identified by the identifier and generates the virtual viewpoint image.

FIG. 12 is a flowchart illustrating image processing to be executed by the image generation apparatuses 1100 according to the third embodiment. Processing of steps S501 to S507 and steps S510 to S511 is similar to the processing of corresponding steps in the flowchart illustrated in FIG. 5, and thus the descriptions thereof are omitted. In the flowchart illustrated in FIG. 12, after the processing of step S507, the processing proceeds to step S1201, and after the processing of step S1202, the processing proceeds to step S510.

In step S1201, the number-of-image-capturing-apparatuses determination unit 1101 determines the number of image capturing apparatuses to be used for rendering processing on the subject at the next frame time, based on the 3D shape predicted position, the virtual viewpoint predicted position, the moving speed of the virtual viewpoint, and the camera parameters. The number-of-image-capturing-apparatuses determination unit 1101 also determines the visibility of the 3D shape when an image of the 3D shape predicted position is captured by each image capturing apparatus, and outputs the identifier of the image capturing apparatus selected depending on the determination result to the virtual viewpoint image generation unit 411.

In step S1202, the virtual viewpoint image generation unit 411 starts to receive, as the captured image for the next frame, the captured image obtained from the image capturing apparatus corresponding to the identifier input from the number-of-image-capturing-apparatuses determination unit 1101. The virtual viewpoint image generation unit 411 thereby generates the virtual viewpoint image, based on the captured images obtained from the image capturing apparatuses.

Figure 13A:
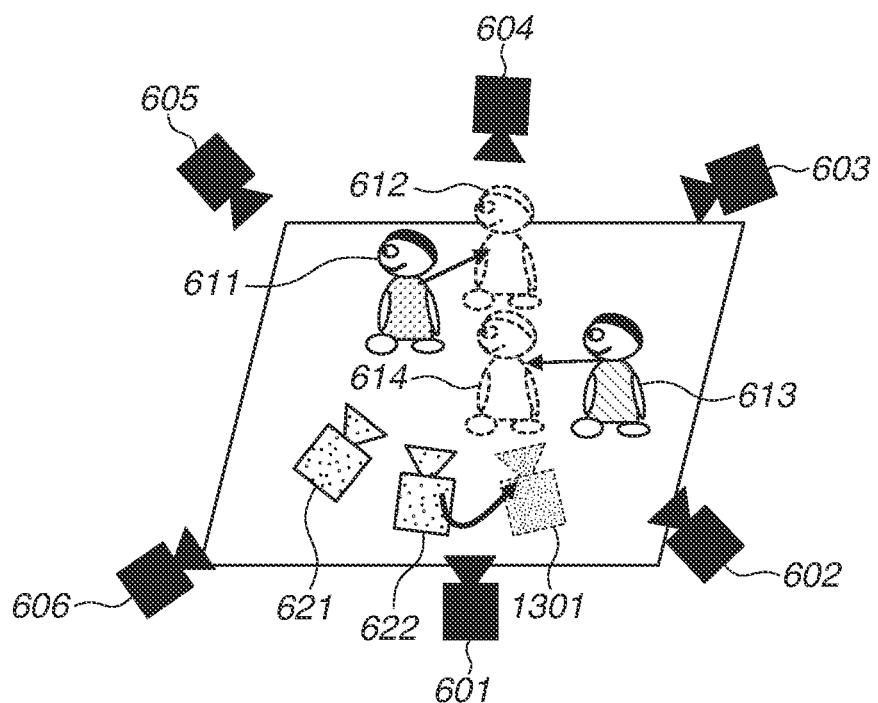
FIGS. 13A and 13B are conceptual diagrams illustrating a virtual space according to the third embodiment.
Figure 13B:
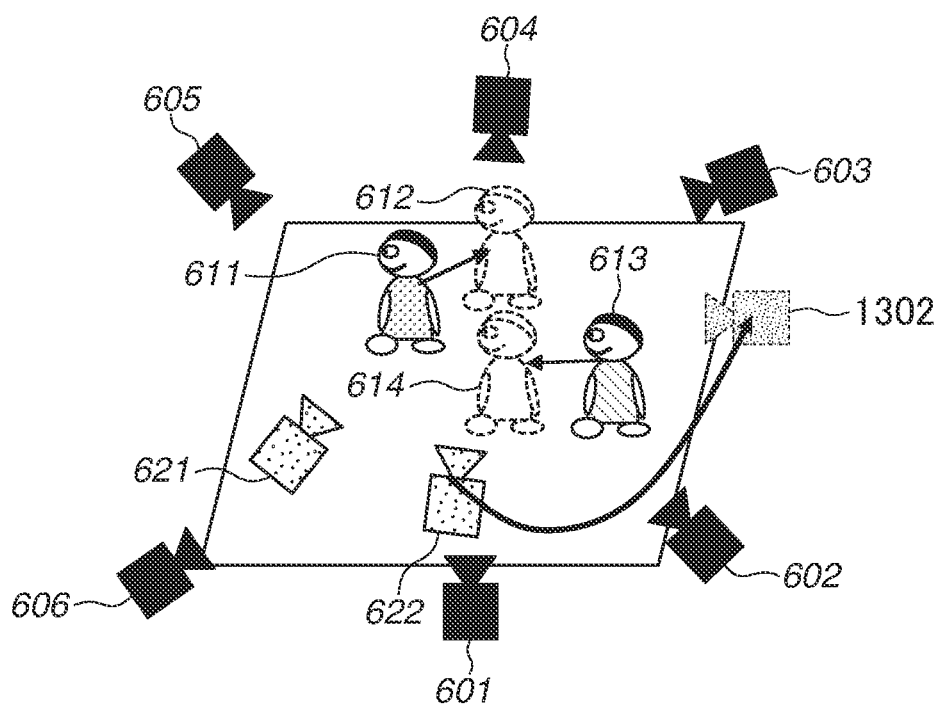

FIGS. 13A and 13B are conceptual diagrams each illustrating a positional relationship between the 3D shape of each subject predicted in the virtual space and predicted virtual viewpoints.

FIGS. 13A and 13B illustrate the image capturing apparatuses 601 to 606 arranged in a linked manner in the virtual space, similar to the example illustrated in FIG. 6B described above. The virtual viewpoint position 622 indicates the virtual viewpoint position corresponding to the playback time information and virtual viewpoint information input from the user. The virtual viewpoint position 621 indicates the virtual viewpoint position in the previous frame. The 3D shape predicted position 612 indicates the 3D shape predicted position predicted in the next frame for the 3D shape 611 of the subject linked in the virtual space. The 3D shape predicted position 614 indicates the 3D shape predicted position predicted in the next frame for the 3D shape 613 of the subject.

FIG. 13A illustrates an example where the moving speed of the virtual viewpoint is lower than or equal to the predetermined set speed, and a virtual viewpoint predicted position 1301 indicates a virtual viewpoint predicted position predicted in the next frame. FIG. 13B illustrates an example where the moving speed of the virtual viewpoint is higher than the predetermined set speed, and a virtual viewpoint predicted position 1302 indicates a virtual viewpoint predicted position predicted in the next frame. In other words, the virtual viewpoint predicted position 1301 in the example of FIG. 13A in which the moving speed of the virtual viewpoint is low greatly differs from the virtual viewpoint predicted position 1302 in the example of FIG. 13B in which the moving speed of the virtual viewpoint is high.

In the example illustrated in FIG. 13A, the moving speed of the virtual viewpoint is less than or equal to the predetermined set speed. Accordingly, the number of image capturing apparatuses determined in a manner linked to the virtual viewpoint predicted position is set to the predetermined number (e.g., three).

In the example illustrated in FIG. 13B, in contrast, the moving speed of the virtual viewpoint is greater than the set speed. The movement range of the virtual viewpoint predicted position therefore expands like a locus indicated by an arrow from the virtual viewpoint position 622 to the virtual viewpoint predicted position 1302. In this case, the number of image capturing apparatuses from which the captured image to be used for generating the virtual viewpoint image is obtained increases. To increase the number of image capturing apparatuses to be used, the number of image capturing apparatuses is set to, for example, a number (e.g., four) that is greater than the predetermined number. In the present embodiment, the number of image capturing apparatuses from which the captured image is obtained is determined depending on the moving speed of the virtual viewpoint, but instead can be increased or decreased depending not only on the moving speed, but also on the installation position and the number of image capturing apparatuses. For example, the number-of-image-capturing-apparatuses determination unit 1101 can determine a larger number of image capturing apparatuses from which the captured image is obtained as the number of image capturing apparatuses to capture images in the same image capturing range increases. In contrast, the number-of-image-capturing-apparatuses determination unit 1101 can determine a smaller number of image capturing apparatuses from which the captured image is obtained as the number of image capturing apparatuses to capture images in the same image capturing range decreases.

As described above, the number of image capturing apparatuses to be used is determined depending on the moving speed of the virtual viewpoint. For example, in the case of capturing images of the 3D shape predicted position 612 and the 3D shape predicted position 614 at the virtual viewpoint predicted position 1301 illustrated in FIG. 13A, three image capturing apparatuses are used. Specifically, in this example, the three image capturing apparatuses 601, 602, and 606 are determined to be the image capturing apparatuses from which the captured image to be used for the next frame is obtained. The number-of-image-capturing-apparatuses determination unit 1101 determines the visibility of the 3D shape when images of the 3D shape predicted position are captured by the three image capturing apparatuses 601, 602, and 606. In the example of FIG. 13A, the image capturing apparatuses 601 and 602 located near the virtual viewpoint predicted position 1301 are selected, and rendering processing is performed on the virtual viewpoint image corresponding to the 3D shape predicted position 614 using the captured images obtained from the image capturing apparatuses 601 and 602. Similarly, the image capturing apparatuses 602 and 606 that are located near the virtual viewpoint predicted position 1301 are selected, and rendering processing is performed on the virtual viewpoint image corresponding to the 3D shape predicted position 612 using the captured images obtained from the image capturing apparatuses 602 and 606.

For example, when images of the 3D shape predicted position 612 and the 3D shape predicted position 614 are captured at the virtual viewpoint predicted position 1302 illustrated in FIG. 13B, four image capturing apparatuses are used as described above. Specifically, in this example, the four image capturing apparatuses 601, 602, 603, and 604 are determined to be the image capturing apparatuses from which the captured image to be used for the next frame is obtained. The number-of-image-capturing-apparatuses determination unit 1101 also determines the visibility of the 3D shape when images of the 3D predicted position are captured by the four image capturing apparatuses 601, 602, 603, and 604. In the example of FIG. 13B, the image capturing apparatuses 602 and 603 located near the virtual viewpoint predicted position 1302 are selected, and rendering processing is performed on the virtual viewpoint image corresponding to the 3D shape predicted position 614 using the captured images obtained from the image capturing apparatuses 602 and 603. Similarly, the image capturing apparatuses 602 and 603 that are located near the virtual viewpoint predicted position 1302 are selected, and rendering processing is performed on the virtual viewpoint image corresponding to the 3D shape predicted position 612 using the captured images obtained from the image capturing apparatuses 602 and 603.

As described above, in the third embodiment, the image capturing apparatuses from which the captured image, to be used for rendering processing on the next frame, is obtained and the number of the image capturing apparatuses is determined based on the 3D shape predicted position, the camera parameters, the virtual viewpoint predicted position, and the moving speed of the virtual viewpoint. According to the third embodiment, a predicted position range that can vary depending on the moving speed of the virtual viewpoint can thereby be covered.

In the first to third embodiments described above, a virtual viewpoint position is designated by a user operation. However, a virtual viewpoint image can be generated using a virtual viewpoint position prepared in advance without limitation of designating the virtual viewpoint position by a user operation.

The above-described embodiments are merely embodiments to carry out the present disclosure, and the technical scope of the present disclosure should not be limited to these examples.

That is, the present disclosure can be carried out in various forms without departing from the technical idea or main features thereof.

According to the present disclosure, it is possible to generate a virtual viewpoint image even when there are a plurality of subjects.

The disclosure of the embodiments includes the configurations, method, program, and system described below.

(Configuration 1)

An image processing apparatus includes an information obtaining unit configured to obtain virtual viewpoint information indicating a position and a direction of a virtual viewpoint, a model obtaining unit configured to obtain a three-dimensional subject model to be generated based on captured images obtained by capturing with a plurality of image capturing apparatuses, a viewpoint prediction unit configured to predict a virtual viewpoint in a second frame subsequent to a first frame in a virtual viewpoint image based on a virtual viewpoint in a frame prior to the first frame, a model prediction unit configured to predict a position of the three-dimensional subject model in the second frame based on the position of the three-dimensional subject model corresponding to the frame prior to the first frame, a determination unit configured to determine an image capturing apparatus from which a captured image to be used for generating the second frame is obtained from among the plurality of image capturing apparatuses based on a predicted virtual viewpoint, a predicted position of the three-dimensional subject model, and image capturing parameters of the plurality of image capturing apparatuses, and an image generation unit configured to generate the virtual viewpoint image based on a captured image corresponding to the second frame obtained from the determined image capturing apparatus, the three-dimensional subject model corresponding to the second frame obtained by the model obtaining unit, and the virtual viewpoint information corresponding to the second frame obtained by the information obtaining unit.

(Configuration 2)

The image processing apparatus according to Configuration 1, wherein the first frame is a frame corresponding to a playback time designated by a user, and wherein the viewpoint prediction unit is configured to predict the virtual viewpoint in the second frame based on virtual viewpoints in at least two frames prior to the first frame.

(Configuration 3)

The image processing apparatus according to Configuration 1 or 2, wherein the first frame is a frame corresponding to a playback time designated by a user, and wherein the model prediction unit is configured to predict a position of the three-dimensional subject model in the second frame based on the three-dimensional subject model in the at least two frames prior to the first frame.

(Configuration 4)

The image processing apparatus according to any one of Configurations 1 to 3, wherein, in a case where the information obtaining unit obtains the virtual viewpoint information indicating a position and a direction of a virtual viewpoint designated by a user, the determination unit is configured to determine the image capturing apparatus from which a captured image to be used for generating the virtual viewpoint image is obtained from among the plurality of image capturing apparatuses based on the virtual viewpoint information designated by the user, and wherein the image generation unit is configured to generate the virtual viewpoint image based on the captured image corresponding to the second frame obtained from the determined image capturing apparatus, the image capturing parameters of the determined image capturing apparatus, the virtual viewpoint information designated by the user, and the three-dimensional subject model corresponding to the second frame obtained by the model obtaining unit.

(Configuration 5)

The image processing apparatus according to any one of Configurations 1 to 4, wherein the determination unit is configured to determine whether the predicted position of the three-dimensional subject model is visible from the predicted virtual viewpoint, and wherein, based on a result of the determination, the determination unit is configured to determine an image capturing apparatus from which a captured image to be used for generating a visual viewpoint image for the second frame is obtained.

(Configuration 6)

The image processing apparatus according to Configuration 5, wherein the determination unit is configured to determine, as an image capturing apparatus from which the captured image to be used for generating the virtual viewpoint image is obtained, at least one image capturing apparatus located near the predicted viewpoint from which the predicted position of the three-dimensional subject model is determined to be visible.

(Configuration 7)

The image processing apparatus according to Configuration 6, wherein, in a case where a predetermined number of two or more image capturing apparatuses are determined to be the image capturing apparatus located near the predicted virtual viewpoint, the image generation unit is configured to use a combined image of images captured by the predetermined number of image capturing apparatuses to generate the virtual viewpoint image.

(Configuration 8)

The image processing apparatus according to any one of Configurations 1 to 7, wherein the determination unit is configured to determine a priority of each of the image capturing apparatuses from which a captured image to be used for generating the virtual viewpoint image for the second frame is obtained based on the predicted virtual viewpoint, the predicted position of the three-dimensional subject model, and the image capturing parameters of the plurality of image capturing apparatuses, and wherein the image generation unit is configured to use the captured images obtained from the image capturing apparatuses and the image capturing parameters of the image capturing apparatuses in an order depending on the priority to generate the virtual viewpoint image.

(Configuration 9)

The image processing apparatus according to Configuration 8, wherein the determination unit is configured to increase the priority of each of the image capturing apparatuses determined to be the image capturing apparatus from which the captured image to be used for generating the virtual viewpoint image for the second frame is obtained, and decrease the priority of each of the image capturing apparatuses not determined to be the image capturing apparatus from which the captured image to be used for generating the virtual viewpoint image for the second frame is obtained.

(Configuration 10)

The image processing apparatus according to Configuration 8 or 9, wherein the determination unit is configured to determine whether the predicted position of the three-dimensional subject model is visible from the predicted virtual viewpoint, and increase the priority of each of the image capturing apparatuses in ascending order of distance from the predicted virtual viewpoint from which the predicted position of the three-dimensional subject model is determined to be visible.

(Configuration 11)

The image processing apparatus according to any one of Configurations 8 to 10, wherein the determination unit is configured to set the higher priority to the image capturing apparatuses located closer to a preliminarily set predetermined virtual point.

(Configuration 12)

The image processing apparatus according to any one of Configurations 8 to 11, wherein the image generation unit is configured to use the captured images obtained from the image capturing apparatuses with the priority within a priority range preliminarily designated for the priority and the image capturing parameters of the image capturing apparatuses to generate the virtual viewpoint image.

(Configuration 13)

The image processing apparatus according to any one of Configurations 1 to 12, wherein the determination unit is configured to determine a number of image capturing apparatuses from which a captured image to be used for generating the virtual viewpoint image for the second frame is obtained based on the predicted virtual viewpoint, the predicted position of the three-dimensional subject model, and the image capturing parameters of the plurality of image capturing apparatuses, and wherein the image generation unit is configured to use the captured images and the image capturing parameters of the determined number of image capturing apparatuses to generate the virtual viewpoint image.

(Configuration 14)

The image processing apparatus according to Configuration 13, wherein the determination unit is configured to obtain a moving speed of the predicted virtual viewpoint, and determine a larger number of image capturing apparatuses in a case where the moving speed is higher than a predetermined set speed.

(Configuration 15)

The image processing apparatus according to claim 13 or 14, wherein the determination unit is configured to obtain a moving speed of the predicted virtual viewpoint, and in a case where the moving speed is less than or equal to a predetermined set speed, the determination unit is configured to set the number of image capturing apparatuses to a predetermined number.

(Configuration 16)

The image processing apparatus according to any one of Configurations 13 to 15, wherein the determination unit is configured to determine whether the predicted position of the three-dimensional subject model is visible from the predicted virtual viewpoint, and select the image capturing apparatus from which a captured image to be used for generating the virtual viewpoint image for the second frame is obtained from among the determined number of image capturing apparatuses.

(Configuration 17)

The image processing apparatus according to any one of Configurations 13 to 16, wherein the determination unit is configured to increase the determined number of image capturing apparatuses as a number of image capturing apparatuses to capture images in an image capturing range increases.

(Method 1)

An image processing method to be executed by an image processing apparatus, the image processing method including obtaining virtual viewpoint information indicating a position and a direction of a virtual viewpoint, obtaining a three-dimensional subject model to be generated based on captured images obtained by capturing with a plurality of image capturing apparatuses, predicting a virtual viewpoint in a second frame subsequent to a first frame in a virtual viewpoint image based on a virtual viewpoint in a frame prior to the first frame, predicting a position of the three-dimensional subject model in the second frame based on the position of the three-dimensional subject model corresponding to the frame prior to the first frame, determining an image capturing apparatus from which a captured image to be used for generating the second frame is obtained from among the plurality of image capturing apparatuses based on a predicted virtual viewpoint, a predicted position of the three-dimensional subject model, and image capturing parameters of the plurality of image capturing apparatuses, and generating the virtual viewpoint image based on a captured image corresponding to the second frame obtained from the determined image capturing apparatus, the three-dimensional subject model corresponding to the second frame, and obtained virtual viewpoint information corresponding to the second frame.

(Program 1)

A program causing a computer to function as an image processing apparatus according to any one of Configurations 1 to 17.

(System 1)

An image processing system including a plurality of image capturing apparatuses located in a physical space, and an image processing apparatus according to any one of Configurations 1 to 17.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-078716, filed May 12, 2022, which is hereby incorporated by reference herein in its entirety.

What is claimed is:

1. An image processing apparatus comprising:
one or more memories storing instructions; and
one or more processors executing the instructions to:
obtain virtual viewpoint information indicating a position and a direction of a virtual viewpoint;
obtain a three-dimensional subject model to be generated based on captured images obtained by capturing with a plurality of image capturing apparatuses;
predict a virtual viewpoint in a second frame subsequent to a first frame in a virtual viewpoint image based on a virtual viewpoint in a frame prior to the first frame;
predict a position of the three-dimensional subject model in the second frame based on the position of the three-dimensional subject model corresponding to the frame prior to the first frame;
determine an image capturing apparatus from which a captured image to be used for generating the second frame is obtained from among the plurality of image capturing apparatuses based on a predicted virtual viewpoint, a predicted position of the three-dimensional subject model, and image capturing parameters of the plurality of image capturing apparatuses; and
generate the virtual viewpoint image based on a captured image corresponding to the second frame obtained from the determined image capturing apparatus, the three-dimensional subject model corresponding to the obtained second frame, and the virtual viewpoint information corresponding to the obtained second frame.

2. The image processing apparatus according to claim 1, wherein the first frame is a frame corresponding to a playback time designated by a user, and
wherein the virtual viewpoint in the second frame is predicted based on virtual viewpoints in at least two frames prior to the first frame.

3. The image processing apparatus according to claim 1, wherein the first frame is a frame corresponding to a playback time designated by a user, and
wherein a position of the three-dimensional subject model in the second frame is predicted based on the three-dimensional subject model in at least two frames prior to the first frame.

4. The image processing apparatus according to claim 1, wherein, in a case where the virtual viewpoint information indicating a position and a direction of a virtual viewpoint designated by a user is obtained, the image capturing apparatus is determined from which a captured image to be used for generating the virtual viewpoint image is obtained from among the plurality of image capturing apparatuses based on the virtual viewpoint information designated by the user, and wherein the virtual viewpoint image is generated based on the captured image corresponding to the second frame obtained from the determined image capturing apparatus, the image capturing parameters of the determined image capturing apparatus, the virtual viewpoint information designated by the user, and the three-dimensional subject model corresponding to the obtained second frame.

5. The image processing apparatus according to claim 1, wherein the one or more processors further execute the instructions to:
determine whether the predicted position of the three-dimensional subject model is visible from the predicted virtual viewpoint, and
determine, based on a result of the determination, an image capturing apparatus from which a captured image to be used for generating a visual viewpoint image for the second frame is obtained.

6. The image processing apparatus according to claim 5, wherein at least one image capturing apparatus located near the predicted viewpoint from which the predicted position of the three-dimensional subject model is determined to be visible, as an image capturing apparatus from which the captured image to be used for generating the virtual viewpoint image is obtained.

7. The image processing apparatus according to claim 6, wherein, in a case where a predetermined number of two or more image capturing apparatuses are determined to be the image capturing apparatus located near the predicted virtual viewpoint, the virtual viewpoint image generated based on a combined image of images captured by the predetermined number of image capturing apparatuses.

8. The image processing apparatus according to claim 1, wherein the one or more processors further execute the instructions to:
determine a priority of each of the image capturing apparatuses from which a captured image to be used for generating the virtual viewpoint image for the second frame is obtained based on the predicted virtual viewpoint, the predicted position of the three-dimensional subject model, and the image capturing parameters of the plurality of image capturing apparatuses, and
wherein the virtual viewpoint image is generated based on the captured images obtained from the image capturing apparatuses and the image capturing parameters of the image capturing apparatuses in an order depending on the priority.

9. The image processing apparatus according to claim 8, wherein the priority of each of the image capturing apparatuses determined to be the image capturing apparatus from which the captured image to be used for generating the virtual viewpoint image for the second frame is obtained is determined higher than the priority of each of the image capturing apparatuses not determined to be the image capturing apparatus from which the captured image to be used for generating the virtual viewpoint image for the second frame is obtained.

10. The image processing apparatus according to claim 8, the one or more processors further execute the instructions to:
determine whether the predicted position of the three-dimensional subject model is visible from the predicted virtual viewpoint, and increase the priority of each of the image capturing apparatuses in ascending order of distance from the predicted virtual viewpoint from which the predicted position of the three-dimensional subject model is determined to be visible.

11. The image processing apparatus according to claim 8, wherein the higher the priority, the closer the image capturing apparatuses is to a preliminarily set predetermined virtual point.

12. The image processing apparatus according to claim 8, wherein the captured images obtained from the image capturing apparatuses with the priority within a priority range preliminarily designated and the image capturing parameters of the image capturing apparatuses are used for generating the virtual viewpoint image.

13. The image processing apparatus according to claim 1, the one or more processors further execute the instructions to:
determine a number of image capturing apparatuses from which a captured image to be used for generating the virtual viewpoint image for the second frame is obtained based on the predicted virtual viewpoint, the predicted position of the three-dimensional subject model, and the image capturing parameters of the plurality of image capturing apparatuses, and
wherein the virtual viewpoint image is generated based on the captured images and the image capturing parameters of the determined number of image capturing apparatuses.

14. The image processing apparatus according to claim 13, the one or more processors further execute the instructions to:
obtain a moving speed of the predicted virtual viewpoint, and
determine a larger number of image capturing apparatuses in a case where the moving speed is higher than a predetermined set speed.

15. The image processing apparatus according to claim 13, the one or more processors further execute the instructions to:
obtain a moving speed of the predicted virtual viewpoint, and in a case where the moving speed is less than or equal to a predetermined set speed, and
determine a number of image capturing apparatuses to a predetermined number.

16. The image processing apparatus according to claim 13, the one or more processors further execute the instructions to:
determine whether the predicted position of the three-dimensional subject model is visible from the predicted virtual viewpoint, and
select the image capturing apparatus from which a captured image to be used for generating the virtual viewpoint image for the second frame is obtained from among the determined number of image capturing apparatuses.

17. The image processing apparatus according to claim 13, wherein the determined number of image capturing apparatuses increases, as a number of image capturing apparatuses to capture images in an image capturing range increases.

18. An image processing method to be executed by an image processing apparatus, the image processing method comprising:
obtaining virtual viewpoint information indicating a position and a direction of a virtual viewpoint;
obtaining a three-dimensional subject model to be generated based on captured images obtained by capturing with a plurality of image capturing apparatuses;
predicting a virtual viewpoint in a second frame subsequent to a first frame in a virtual viewpoint image based on a virtual viewpoint in a frame prior to the first frame;

predicting a position of the three-dimensional subject model in the second frame based on the position of the three-dimensional subject model corresponding to the frame prior to the first frame;

determining an image capturing apparatus from which a captured image to be used for generating the second frame is obtained from among the plurality of image capturing apparatuses based on a predicted virtual viewpoint, a predicted position of the three-dimensional subject model, and image capturing parameters of the plurality of image capturing apparatuses; and generating the virtual viewpoint image based on a captured image corresponding to the second frame obtained from the determined image capturing apparatus, the three-dimensional subject model corresponding to the obtained second frame, and the virtual viewpoint information corresponding to the obtained second frame.

19. A non-transitory computer-readable storage medium storing a program for causing a computer to execute a image processing method, the method comprising:

obtaining virtual viewpoint information indicating a position and a direction of a virtual viewpoint;

obtaining a three-dimensional subject model to be generated based on captured images obtained by capturing with a plurality of image capturing apparatuses;

predicting a virtual viewpoint in a second frame subsequent to a first frame in a virtual viewpoint image based on a virtual viewpoint in a frame prior to the first frame;

predicting a position of the three-dimensional subject model in the second frame based on the position of the three-dimensional subject model corresponding to the frame prior to the first frame;

determining an image capturing apparatus from which a captured image to be used for generating the second frame is obtained from among the plurality of image capturing apparatuses based on a predicted virtual viewpoint, a predicted position of the three-dimensional subject model, and image capturing parameters of the plurality of image capturing apparatuses; and generating the virtual viewpoint image based on a captured image corresponding to the second frame obtained from the determined image capturing apparatus, the three-dimensional subject model corresponding to the obtained second frame, and the virtual viewpoint information corresponding to the obtained second frame.

* * * * *